(12) United States Patent
Hoda et al.

(10) Patent No.: US 11,842,469 B2
(45) Date of Patent: Dec. 12, 2023

(54) APPARATUS, A METHOD AND A COMPUTER-READABLE NON-TRANSITORY STORAGE MEDIUM TO PICK UP A PLURALITY OF IMAGE AT DIFFERENT IN-FOCUS POSITIONS

(71) Applicant: CANON KABUSHIKI KAISHA, Tokyo (JP)

(72) Inventors: Saori Hoda, Tokyo (JP); Masanao Yokoyama, Kanagawa (JP); Masahiro Yamashita, Kanagawa (JP); Hiroshi Yamazaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/205,650

(22) Filed: Mar. 18, 2021

(65) Prior Publication Data

US 2021/0306550 A1 Sep. 30, 2021

(30) Foreign Application Priority Data

Mar. 26, 2020 (JP) .................................. 2020-055972

(51) Int. Cl.
*G06T 5/50* (2006.01)
*H04N 7/18* (2006.01)
(Continued)

(52) U.S. Cl.
CPC .................. *G06T 5/50* (2013.01); *G02B 7/38* (2013.01); *G06T 7/20* (2013.01); *H04N 7/183* (2013.01);
(Continued)

(58) Field of Classification Search
None
See application file for complete search history.

(56) References Cited

U.S. PATENT DOCUMENTS

2009/0073285 A1* 3/2009 Terashima ........... H04N 23/633
                                                            348/222.1
2010/0128163 A1* 5/2010 Nagasaka ........ H04N 5/232133
                                                            348/E5.045
(Continued)

FOREIGN PATENT DOCUMENTS

WO     2017090233 A1     6/2017

*Primary Examiner* — Quan Pham
(74) *Attorney, Agent, or Firm* — CANON U.S.A., INC. IP Division

(57) ABSTRACT

An apparatus includes at least one memory configured to store instructions, at least one processor in communication with the at least one memory and configured to execute the instructions to receive a photographing instruction, and an optical system configured to perform a first photographing method before reception of the photographing instruction, and a second photographing method after reception of the photographing instruction. The at least one processor further executes instructions to combine a plurality of first images at different in-focus positions captured by using the first photographing method with a plurality of second images at different in-focus positions captured by using the second photographing method. The optical system performs readout an image sensor, while keeping the drive of a focus lens, in the first photographing method, and stops the focus lens at different positions in the second photographing method.

25 Claims, 20 Drawing Sheets

(51) Int. Cl.
*G02B 7/38* (2021.01)
*G06T 7/20* (2017.01)
*H04N 23/67* (2023.01)
*H04N 23/80* (2023.01)

(52) U.S. Cl.
CPC .......... *H04N 23/67* (2023.01); *H04N 23/676* (2023.01); *H04N 23/80* (2023.01); *G06T 2207/20221* (2013.01)

(56) References Cited

U.S. PATENT DOCUMENTS

| | | | |
|---|---|---|---|
| 2011/0273471 A1* | 11/2011 | Nagasaka | H04N 5/232123 345/619 |
| 2015/0350526 A1* | 12/2015 | Toyoda | H04N 5/2356 348/349 |
| 2018/0172949 A1* | 6/2018 | Oogami | H04N 5/378 |
| 2019/0089908 A1* | 3/2019 | Matsunaga | H04N 5/232127 |
| 2019/0199920 A1* | 6/2019 | Matsunaga | H04N 23/673 |
| 2021/0158496 A1* | 5/2021 | Bouchard | H04N 5/23229 |

* cited by examiner

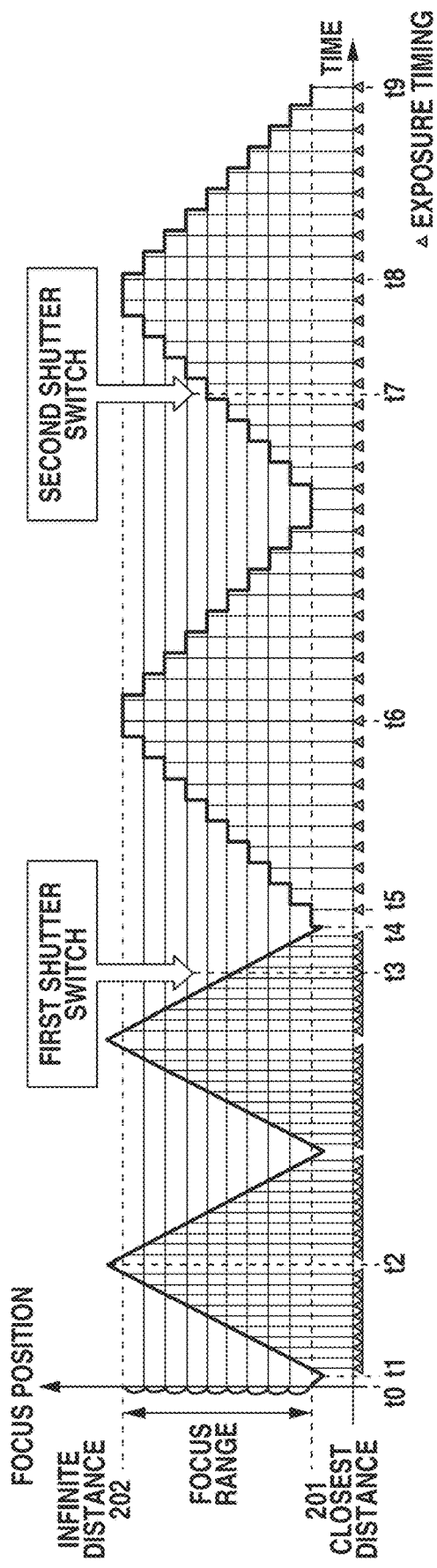
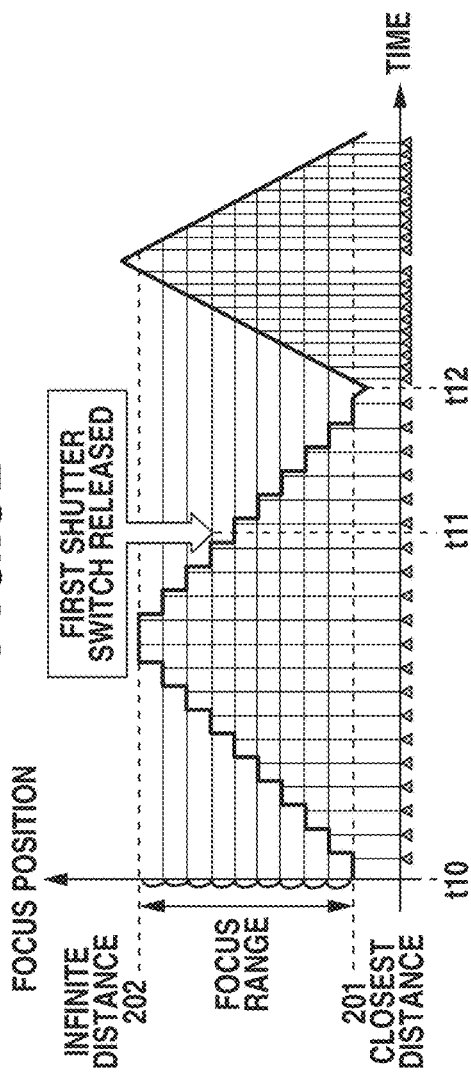

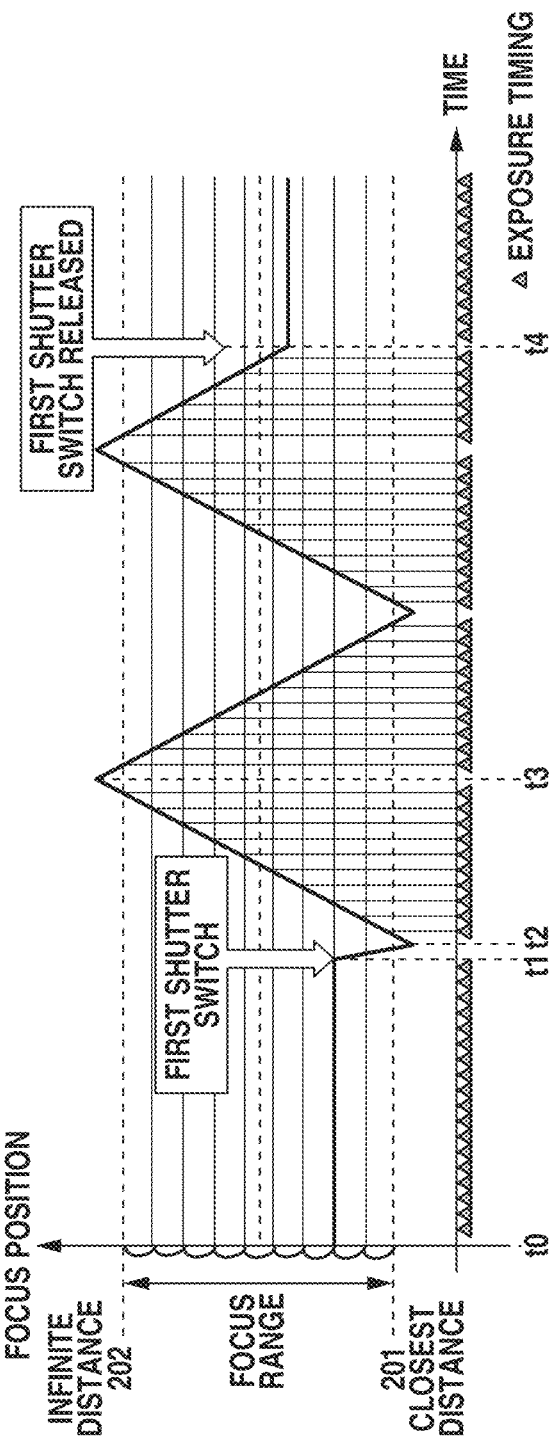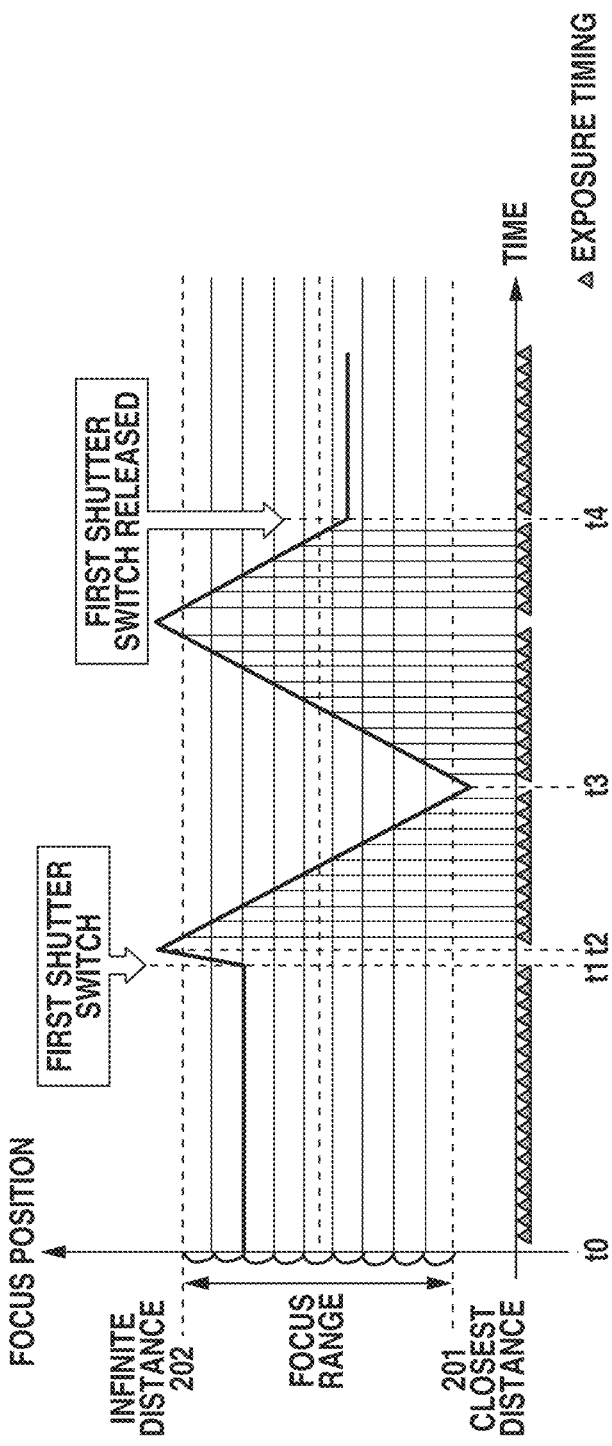

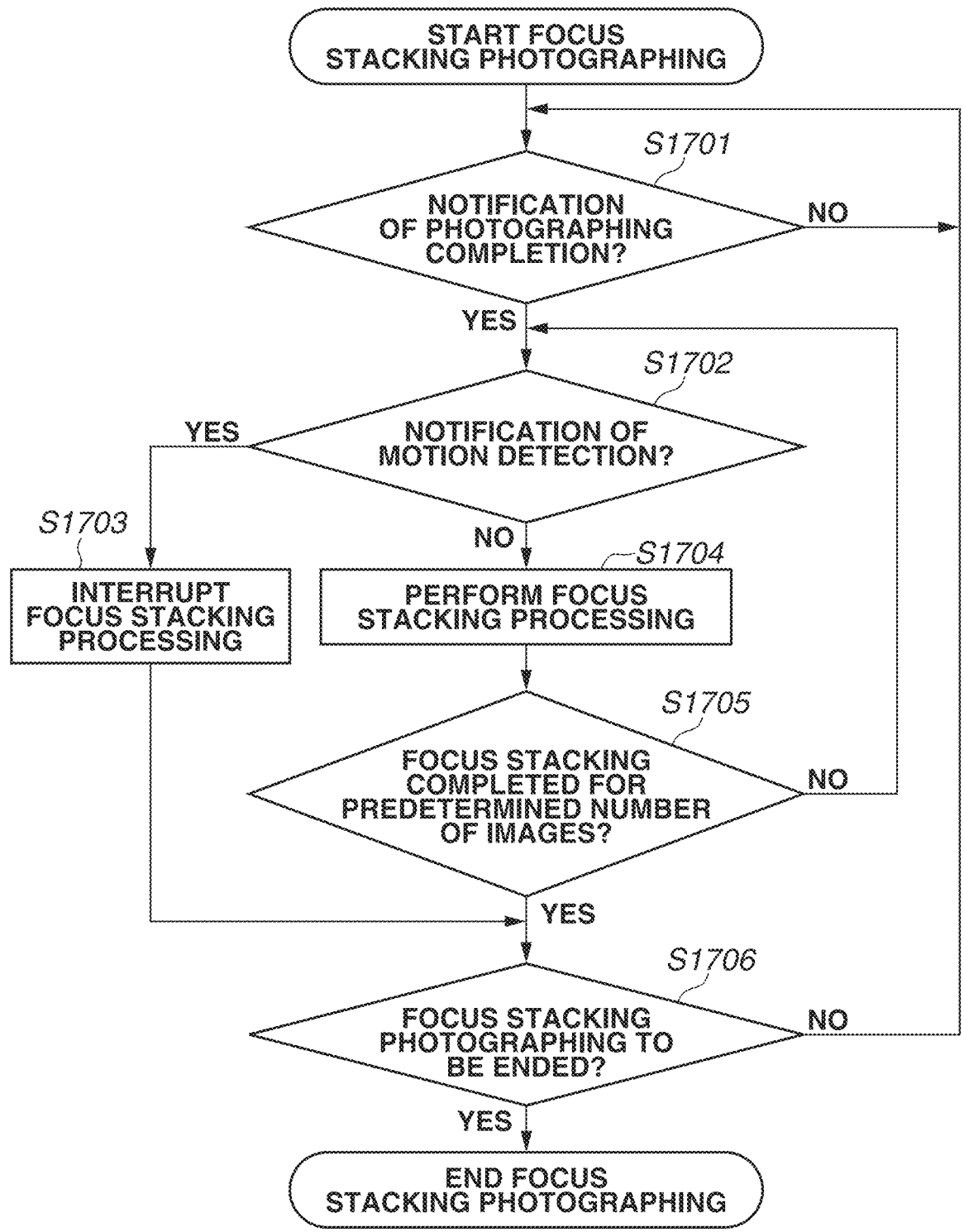

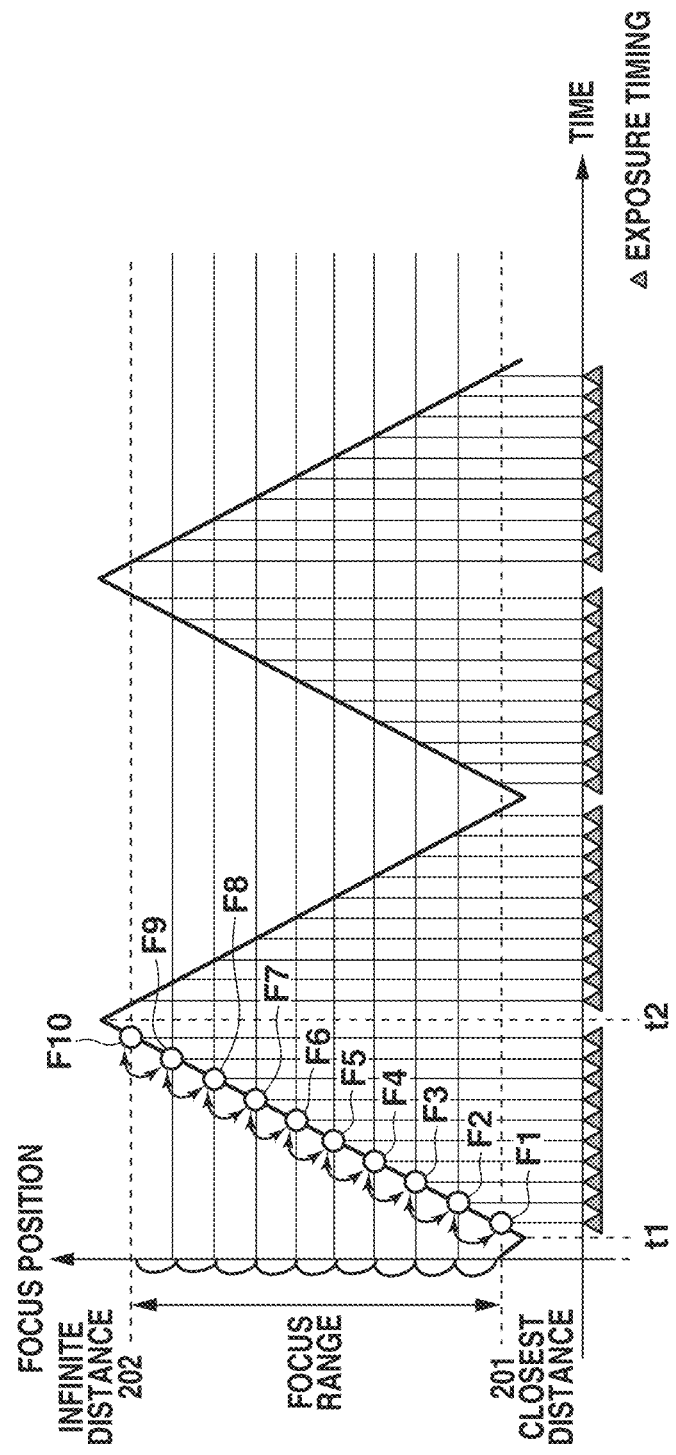

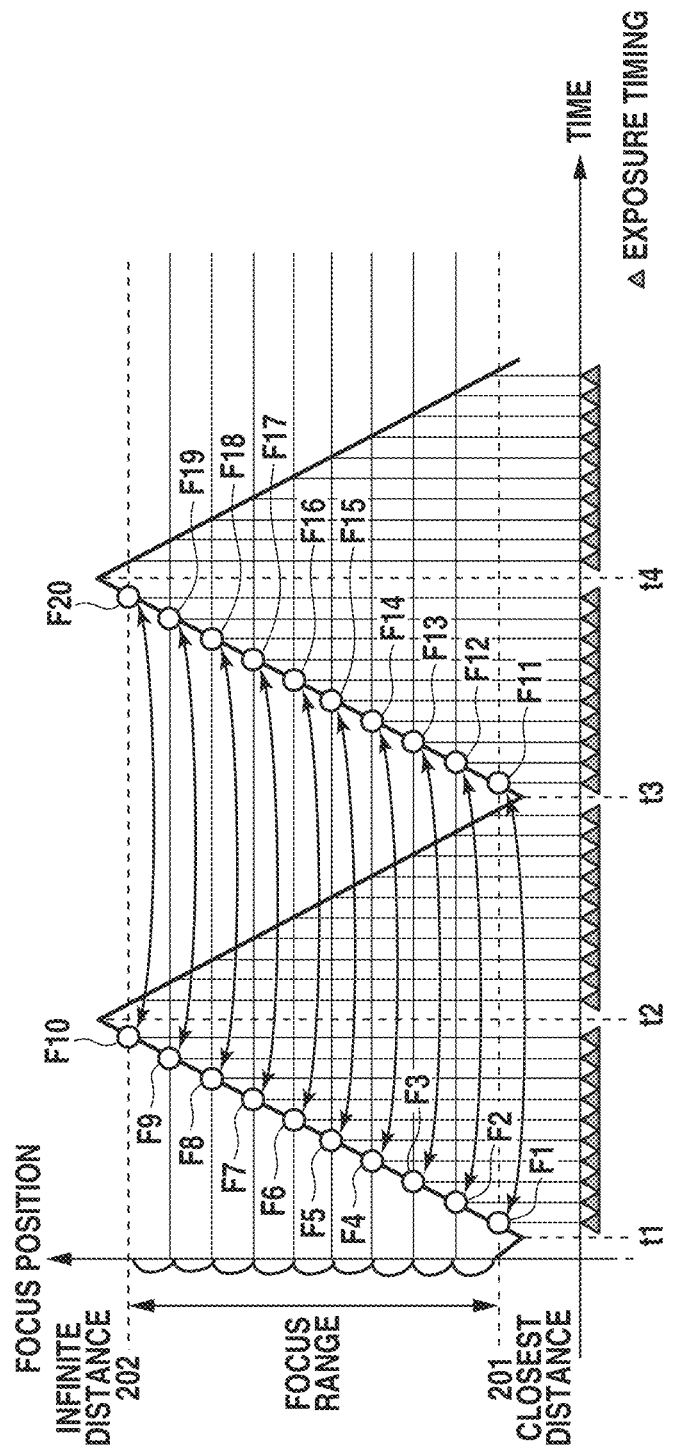

APPARATUS, A METHOD AND A COMPUTER-READABLE NON-TRANSITORY STORAGE MEDIUM TO PICK UP A PLURALITY OF IMAGE AT DIFFERENT IN-FOCUS POSITIONS

BACKGROUND OF THE DISCLOSURE

Field of the Disclosure

The aspect of the embodiments relates to imaging apparatus, and more particularly, to an imaging apparatus that captures images at different in-focus positions.

Description of the Related Art

There is a technique known to capture a plurality of images at different in-focus positions in the optical axis direction (focus bracketing), extract in-focus regions in respective images, and combine the images with an enlarged depth of field. This is, what is called, the focus stacking technique. There has been a demand for more quickly checking whether a focus stacking image intended by the user can be generated.

Shortening the time taken to perform the focus bracketing is a factor for quickly checking whether a focus stacking image intended by the user can be generated.

International Publication WO 2017/090233 discloses two different focus bracketing techniques: one technique captures an image a plurality number of times while stopping the motion of a focus lens for a short time, and the other captures an image a plurality number of times without stopping the motion of the focus lens. The technique for capturing an image a plurality number of times without stopping the motion of the focus lens takes a shorter photographing time.

However, to obtain images to be combined for focus stacking, all of the images to be used for focus stacking is to be captured, prolonging the time period since the user starts photographing till a focus stacking image is displayed.

International Publication WO 2017/090233 discloses the two different focus bracketing techniques but does not consider the relation between the display and the techniques.

SUMMARY OF THE DISCLOSURE

According to an aspect of the embodiments, an apparatus includes at least one memory configured to store instructions, at least one processor in communication with the at least one memory and configured to execute the instructions to receive a photographing instruction, and an optical system configured to perform a first photographing method before reception of the photographing instruction, and a second photographing method after reception of the photographing instruction. The at least one processor further executes instructions to combine a plurality of first images at different in-focus positions captured by using the first photographing method with a plurality of second images at different in-focus positions captured by using the second photographing method. The optical system performs readout from a sensor, while keeping the drive of a focus lens, to acquire the plurality of first images when using the first photographing method, and stops the focus lens at different positions and performs readouts the sensor a plurality of times to acquire the plurality of second images by using the second photographing method.

Further features of the disclosure will become apparent from the following description of exemplary embodiments with reference to the attached drawings.

BRIEF DESCRIPTION OF THE DRAWINGS

FIGS. 3A and 3B illustrate a photographing operation according to the first exemplary embodiment.

FIGS. 9A and 9B illustrate operations from a state where a signal SW1 is not generated to a state where the signal SW1 is being generated according to a third exemplary embodiment.

FIG. 17 is a flowchart illustrating focus stacking processing according to the fourth exemplary embodiment.

FIG. 18 illustrates detection of a subject's motion using images at adjacent focus positions according to the fourth exemplary embodiment.

FIG. 19 illustrates detection of the subject's motion using images at the same focus positions according to the fourth exemplary embodiment.

DESCRIPTION OF THE EMBODIMENTS

Exemplary embodiments of the disclosure will be described in detail below with reference to the accompanying drawings. The following exemplary embodiments do not limit the disclosure within the ambit of the appended claims.

Not all of the combinations of the features described in the present exemplary embodiments are used to the solutions for the disclosure.

Figure 1:
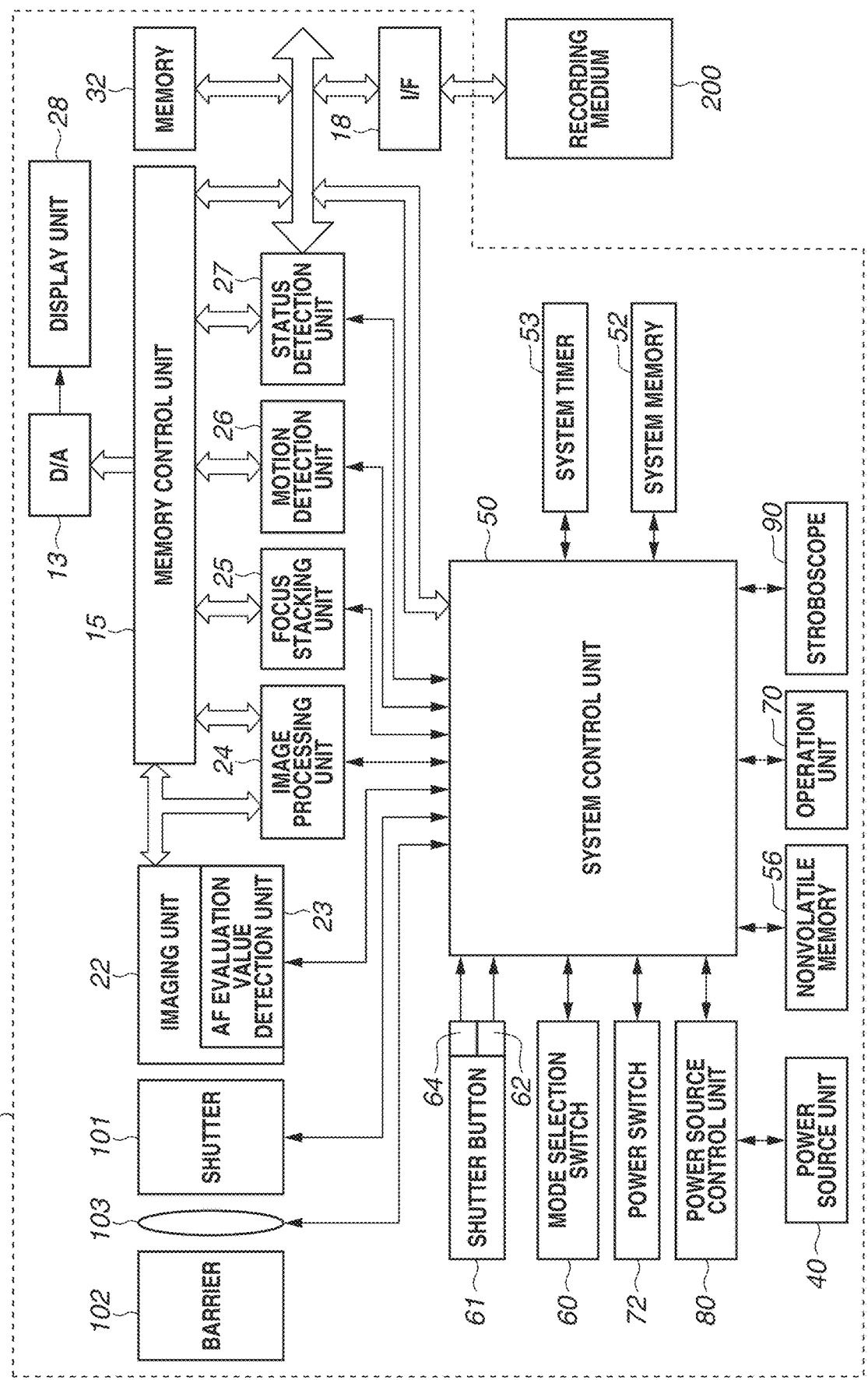
FIG. 1 is a block diagram illustrating a hardware configuration of a digital camera 100 as an imaging apparatus according to an exemplary embodiment of the disclosure.

FIG. 1 is a block diagram illustrating a hardware configuration of a digital camera 100 as an imaging apparatus according to the present exemplary embodiment.

Referring to FIG. 1, the digital camera 100 includes an imaging system including a shutter 101, a barrier 102, a focus lens 103, and an imaging unit 22.

The shutter 101 is provided with a diaphragm function.

The barrier 102 covers the imaging system of the digital camera 100 to prevent stain and damage to the imaging system.

The focus lens 103 is included in a lens group (not illustrated) disposed between the shutter 101 and the barrier 102. The lens group also includes a zoom lens and other lenses.

The imaging unit 22 includes an image sensor, such as a charge coupled device (CCD) sensor or a complementary metal oxide semiconductor (CMOS) sensor, for converting an optical image into electrical signals, and is provided with an analog-to-digital (A/D) conversion processing function. Output data (captured image) from the imaging unit 22 is stored in a memory 32 via an image processing unit 24 and a memory control unit 15, or directly stored therein via the memory control unit 15. In the focus bracketing by driving release or intermittent drive (described below), all of the set number of captured images are stored in the memory 32.

The digital camera 100 further includes an automatic focus (AF) evaluation value detection unit 23, a stroboscope 90, an image processing unit 24, a focus stacking unit 25, a motion detection unit 26, a status detection unit 27, the memory 32, a digital-to-analog (D/A) converter 13, a display unit 28, a nonvolatile memory 56, a system control unit 50, a system memory 52, and a system timer 53.

The AF evaluation value detection unit 23 calculates AF evaluation values based on contrast information obtained from digital image signals present inside the imaging unit 22 and outputs the obtained AF evaluation values from the imaging unit 22 to the system control unit 50.

The stroboscope 90 flashes at the time of photographing in a low-illuminance or a backlight scene to supplement the illuminance.

The image processing unit 24 subjects image data from the imaging unit 22 or the memory control unit 15 to predetermined pixel interpolation, resize processing such as reduction, and color conversion processing. The image processing unit 24 subjects captured image data to predetermined calculation processing. Then, the system control unit 50 performs exposure control and distance measurement control based on obtained calculation results. Thus, the lens (through-the-lens metering, or TTL)-based automatic exposure (AE) processing and automatic electronic flash preliminary emission (EF) are performed. In the automatic focus (AF) processing by the image processing unit 24, the output from the AF evaluation value detection unit 23 in the imaging unit 22 may be used. The image processing unit 24 further subjects captured image data to predetermined calculation processing, and performs TTL-based automatic white balance (AWB) processing based on obtained calculation results.

The focus stacking unit 25 outputs in-focus pixels in each image using a plurality of images captured through focus bracketing by the imaging unit 22, to generate an image with an enlarged depth of field. Details will be described below.

The motion detection unit 26 subjects two pieces of image data to template matching processing at a target region and the periphery thereof to derive a motion vector for each of a plurality of divided regions in the images or for each pixel. When the derived motion vector is equal to or larger than a threshold value, the motion detection unit 26 detects the subject's motion and notifies the system control unit 50 of the motion.

The status detection unit 27 detects the condition of the digital camera 100, such as the angular velocity obtained by a gyro sensor, the attachment/detachment of the tripod, and user settings via the operation unit 70. Then, the status detection unit 27 notifies the system control unit 50 of detection results.

The memory 32 stores image data captured and subjected to A/D conversion by the imaging unit 22, and image data to be displayed on the display unit 28. The memory 32 has a sufficient memory capacity for storing a predetermined number of still images, and moving images and sound data for a predetermined time period. The memory 32 also serves as an image display memory (video memory).

The D/A converter 13 converts image display data stored in the memory 32 into analog signals and supplies the analog signals to the display unit 28. In this way, image display data stored in the memory 32 is displayed by the display unit 28 via the D/A converter 13.

The display unit 28 displays the image data corresponding to the analog signals from the D/A converter 13 on a display unit such as a liquid crystal display (LCD). The digital signals once subjected to A/D conversion by the imaging unit 22 and accumulated in the memory 32 are converted into analog signals by the D/A converter 13 and then successively transferred to the display unit 28 for display. In this way, the display unit 28 functions as an electronic viewfinder that displays a through image (hereinafter referred to as a live view).

The nonvolatile memory 56, such as a flash memory, is an electrically erasable and recordable memory. Constants and programs for operations of the system control unit 50 are stored in the nonvolatile memory 56. Programs are used to carry out processes following various flowcharts (described below) according to the first to the fourth exemplary embodiments.

The system control unit 50 controls the entire digital camera 100. More specifically, by running programs recorded in the above-described nonvolatile memory 56, the system control unit 50 implements the focus bracketing by driving release according to the first to the fourth exemplary embodiments (described below) based on subject information, subject distance, and image contrast information. More specifically, during the focus bracketing, the system control unit 50 controls the drive of the focus lens 103 and the shutter 101 to sequentially capture a plurality of images at different in-focus positions. The focus position variation (focus step) between adjacent captured images obtained in the above-described photographing processing is set by the user by selecting a value from among a plurality of preset values via the operation unit 70.

The system memory 52 including a RAM is used to load constants and variables for operations of the system control unit 50 and programs read from the nonvolatile memory 56. The system control unit 50 also performs display control by controlling the memory 32, the D/A converter 13, and the display unit 28.

The system timer 53 is a unit for measuring the time taken for various types of control and the time of the internal clock.

The digital camera 100 is provided with operation means for inputting various types of operation instructions to the system control unit 50. The operation means includes a mode selection switch 60, a shutter button 61, a first shutter switch 64, a second shutter switch 62, the operation unit 70, and a power switch 72.

The mode selection switch 60 changes the operation mode of the system control unit 50 to any from among the still image recording mode, the moving image recording mode, the playback mode, and other modes. The still image recording mode includes automatic photographing mode, automatic scene distinction mode, manual mode, various scene modes offering imaging settings for different imaging scenes, program AE mode, and custom mode. The mode selection switch 60 is used to directly select one of these modes included in the still image photographing mode. Alternatively, after once the still image photographing mode is selected via the mode selection switch 60, one of these modes included in the still image photographing mode may be selected via other operation members. Likewise, the moving image photographing mode may include a plurality of modes.

The shutter button 61 is an operation member for issuing a photographing instruction.

The first shutter switch 64 turns ON in the middle of operation (half-depression) of the shutter button 61 to generate a first shutter switch signal SW1. The first shutter switch signal SW1 causes the system control unit 50 to start AF processing, AE processing, AWB processing, and EF processing. More specifically, imaging parameters are acquired under the control of the system control unit 50. The user can select center point AF processing and face AF processing as AF processing to be started upon reception of the first shutter switch signal SW1. The center point AF processing refers to AF processing applied to one point at the center position in the photographing screen, and the face AF processing refers to AF processing on a face in the photographing screen detected by the face detection function.

A second shutter switch 62 turns ON upon completion of operation (full-depression) of the shutter button 61 to generate a second shutter switch signal SW2 (full-depression means a photographing instruction). The second shutter switch signal SW2 starts the system control unit 50 performing a series of photographing operations ranging from signal reading from the imaging unit 22 to image data writing in a recording medium 200.

When the user performs an operation for selecting one of various function icons displayed on the display unit 28, each operation member of the operation unit 70 is suitably assigned a function for each scene to serve as a function button. Examples of function buttons include an end button, a return button, an image feeding button, a jump button, a narrowing-down button, and an attribute change button. For example, when a menu button is pressed, a menu screen allowing various settings is displayed on the display unit 28. The user can intuitively set various settings on the menu screen displayed on the display unit 28 and with the cross key (four-way operation key) and the SET button.

The power switch 72 turns power of the digital camera 100 ON and OFF.

The digital camera 100 further includes a power source control unit 80, a power source unit 40, and a recording medium interface (I/F) 18.

The power source control unit 80 includes a battery detection circuit, a direct-current to direct-current (DC-DC) converter, and a switch circuit for selecting a block to be supplied with power, and detects the presence or absence of a battery, a battery type, and remaining battery capacity. The power source control unit 80 also controls the DC-DC converter based on detection results and instructions of the system control unit 50 to supply voltages to the respective units including the recording medium 200 for proper periods.

The power source unit 40 includes a primary battery (such as an alkaline battery or lithium battery), a secondary battery (such as a NiCd battery, NiMH battery, or lithium battery), and an alternating current (AC) adaptor.

The recording medium interface (I/F) 18 is an interface to the recording medium 200 such as a memory card or a hard disk. The recording medium 200 is used for recording captured images, such as a memory card, and includes a semiconductor memory or a magnetic disk.

The following is a description of the overview of the focus bracketing by driving release and intermittent drive with reference to FIG. 1.

The focus bracketing by driving release refers to photographing in which the imaging unit 22 performs the exposure and signal read operations while driving the focus lens 103. During this photographing, the system control unit 50 keeps driving the focus lens 103 at a constant focus variation per unit time (focus change rate) not to stop the focus lens 103.

The focus bracketing by intermittent drive refers to photographing in which, with the focus lens 103 that has moved to and stopped at a desired focus position, the imaging unit 22 performs the exposure and signal read operations. In the focus bracketing by intermittent drive, the focus lens 103 is to be operated as follows. When stopping, the focus lens 103 is to become at rest. When the focus lens 103 at a stop status starting to be driven, the focus lens 103 is to be gradually accelerated up to a desired driving speed. In the focus bracketing by driving release, on the other hand, the focus lens 103 is to be not stopped. This saves the period the focus lens 103 is at rest for and the time the focus lens 103 at a stop status is accelerated up to a predetermined focus variation, achieving high-speed focus bracketing.

The focus change rate in the focus bracketing is determined based on the performance of the focus lens 103 and the read time of the image sensor of the imaging unit 22. More specifically, the system control unit 50 determines the focus change rate so that the focus position variation during the read time does not exceed the focus variation determined in the focus step. This guarantees that the focus variation in the captured image is within the range of the focus step.

Basic operations of the focus stacking processing by the digital camera 100 will be described with reference to the accompanying drawings.

Figure 2:
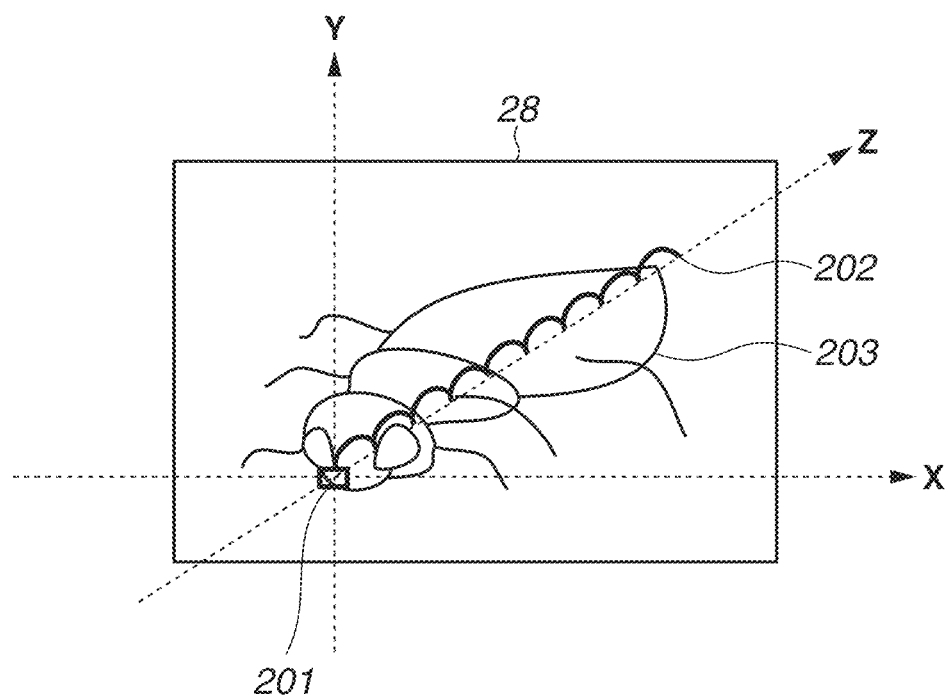
FIG. 2 illustrates an image displayed on a display unit when a focus stacking image is live-viewed according to a first exemplary embodiment.

FIG. 2 illustrates an image displayed on the display unit 28 when the focus stacking image is live-viewed according to the present exemplary embodiment. A position 201 indicates the closest distance focus position in the focus bracketing indicated by an AF frame, a position 202 indicates the infinite distance focus position, and a position 203 indicates a subject (insect). The display unit 28 displays the AF frame indicating the closest distance focus position 201 and the subject 203.

The user operates the operation unit 70 to specify a reference focus position on the image displayed on the display unit 28. In FIG. 2, the closest distance portion of the subject 203 is specified as a reference focus position. Thus, the system control unit 50 recognizes the specified reference focus position as the closest distance focus position 201 in the focus bracketing, and displays the AF frame at that position. When the closest distance focus position 201 is determined, the focus position where focus bracketing is completed, i.e., the infinite distance focus position 202 is determined in the Z-axis direction (depth direction) by the focus intervals according to the focus step setting and the number of times of photographing to generate a focus stacking image. In FIG. 2, the entire subject 203 is in the focus range from the closest distance focus position 201 to the infinite distance focus position 202. It is assumed that photographing to generate a focus stacking image is performed 10 times and that the focus stacking unit 25 subjects 10 captured images to the focus stacking processing.

Focus lens drive operations by driving release when the live view is displayed and by intermittent drive when the signals SW1 or SW2 are being generated will be described with reference to FIGS. 3A and 3B to 6.

FIGS. 3A and 3B illustrate a photographing operation according to the present exemplary embodiment.

The operation sequence of the focus lens 103 and the imaging unit 22 will be described with reference to FIG. 3A, in which the horizontal axis represents time and the vertical axis represents focus positions.

At time t0, the user is not pressing the shutter button 61; neither the signal SW1 nor SW2 is being generated. In this state, the system control unit 50 performs focus bracketing by driving release.

At time t1, the system control unit 50 moves the focus lens 103 to the drive start focus position and starts the drive of the focus lens 103. A technique disclosed in Japanese Patent Application No. 2019-121811 is used as a method of determining the drive start focus position. The technique in the above-described document involves pre-calculating the drive start focus position to achieve a constant speed of the focus lens 103 at all focus positions where focus bracketing is performed, and starts the drive at a position closer than the closest distance focus position 201.

During the period from time t1 to time t2, the imaging unit 22 captures 10 images for generating a focus stacking image, at equal intervals from the closest distance focus position 201 to the infinite distance focus position 202. Also, during the period from time t1 to time t2, the system control unit 50 adjusts the speed of the focus lens 103 to the imaging rate of the imaging unit 22 to enable the exposure operation at a predetermined focus position.

After the imaging unit 22 captures 10 images, the system control unit 50 decelerates the focus lens 103 and then stops it at time t2. Simultaneously, the system control unit 50 instructs the focus stacking unit 25 to generate a focus stacking image based on the 10 images, and instructs the display unit 28 to display the focus stacking image.

At time t2 and after, the system control unit 50 starts the drive of the focus lens 103, like the operation at time t1. Then, after capturing 10 images at equal intervals from the infinite distance focus position 202 to the closest distance focus position 201, the imaging unit 22 stops the focus lens 103. At the same time, the system control unit 50 instructs the focus stacking unit 25 to generate a focus stacking image based on the 10 images, and instructs the display unit 28 to display the focus stacking image.

As described above, the system control unit 50 repeats the forward path operation started at time t1 and the return path operation started at time t2.

At time t3, the user is half-pressing the shutter button 61 to generate the signal SW1. However, at this timing, the imaging unit 22 is in the middle of the return path operation; it has not yet captured all of the 10 images for generating a focus stacking image. The system control unit 50 therefore continues photographing up to the closest distance focus position 201 and stops the focus lens 103 at time t4. At the same time, the focus stacking unit 25 generates a focus stacking image based on the 10 images, and instructs the display unit 28 to display the focus stacking image.

At time t4 and after, the user is half-pressing the shutter button 61; the signal SW1 is being generated. In this state, the system control unit 50 performs the focus bracketing by intermittent drive. When the user is half-pressing the shutter button 61, the user is assumed to feel like checking the preview with higher focus accuracy. According to the first exemplary embodiment, during the generation of the signal SW1, it is assumed that the system control unit 50 controls the focus lens 103 by intermittent drive providing higher focus accuracy than driving release.

During the period from time t4 to time t6, the imaging unit 22 captures 10 images for generating a focus stacking image at equal intervals from the closest distance focus position 201 to the infinite distance focus position 202. Since the focus lens 103 is driven at focus steps common to driving release and intermittent drive, the system control unit 50 controls each exposure timing in the focus bracketing by intermittent drive to be set to the same focus position as the corresponding focus position in the focus bracketing by driving release.

The first photographing at time t4 to t5 will be described. At time t4, the system control unit 50 moves the focus lens 103 to the closest distance focus position 201 and then stops it. After the focus lens 103 is at rest, the imaging unit 22 performs the exposure and signal read operations at time t5. More specifically, the period from time t4 to time t5 is the period that the focus lens 103 is at rest for.

The system control unit 50 repeats similar processing for the second and subsequent photographing. More specifically, after the imaging unit 22 has captured 10 images at time t6, the system control unit 50 instructs the focus stacking unit 25 to generate a focus stacking image based on the 10 images, and instructs the display unit 28 to display the focus stacking image.

At time t6 and after, like the operation from time t4, the imaging unit 22 captures 10 images at equal intervals from the infinite distance focus position 202 to the closest distance focus position 201. Then, the system control unit 50 instructs the focus stacking unit 25 to generate a focus stacking image based on the 10 images, and instructs the display unit 28 to display the focus stacking image.

As described above, the imaging unit 22 repeats the forward path operation started at time t4 and the return path operation started at time t6.

At time t7, the user is fully pressing the shutter button 61 to generate the signal SW2. At time t7, the imaging unit 22 however is in the middle of the forward path operation during the generation period of the signal SW1, and has not yet captured all of the 10 images for generating a focus stacking image. The system control unit 50 continues capturing images up to the infinite distance focus position 202, then instructs the focus stacking unit 25 to generate a focus stacking image based on the 10 images, and instructs the display unit 28 to display the focus stacking image.

At time t8 and after, the user is fully pressing the shutter button 61; the signal SW2 is being generated. In this state, like the state where the signal SW1 is being generated, the system control unit 50 performs the focus bracketing by intermittent drive.

During the period from time t8 to time t9, like the operation from time t6, the imaging unit 22 captures 10 images at equal intervals from the infinite distance focus position 202 to the closest distance focus position 201. Then, the system control unit 50 instructs the focus stacking unit 25 to generate a focus stacking image based on the 10 images, and instructs the display unit 28 to display the focus stacking image. When the signal SW2 is being generated, the system control unit 50 records the focus stacking image in the recording medium 200.

According to the present exemplary embodiment, when the signals SW1 and SW2 are being generated, the system control unit 50 changes the drive of the focus lens 103 at the time the focus lens 103 reaches the infinite distance focus position 202 in the forward path operation and at the time the focus lens 103 reaches the closest distance focus position 201 in the return path operation.

The operation sequence in a state where the user stops half-pressing the shutter button 61, i.e., the generation of the signal SW1 is stopped will be described with reference to FIG. 3B.

At time t10, the user is half-pressing the shutter button 61; the signal SW1 is being generated. In this state, the system control unit 50 performs the focus bracketing by intermittent drive.

At time t11, the user stops half-pressing the shutter button 61; the generation of the signal SW1 is stopped. The imaging unit 22 is in the middle of the return path operation during the generation period of the signal SW1, and hence has not yet captured all of the 10 images for generating a focus stacking image. The system control unit 50 continues capturing images up to the closest distance focus position 201, then instructs the focus stacking unit 25 to generate a focus stacking image based on the 10 images, and instructs the display unit 28 to display the focus stacking image.

At time t12 and after, the system control unit 50 performs the focus bracketing by driving release, like the operation sequence at time t1 and after illustrated in FIG. 3A.

In the above-described photographing operation illustrated in FIGS. 3A and 3B, the imaging unit 22 performs photographing a plurality of times to capture images for focus stacking.

Specific photographing operations according to the present exemplary embodiment will be described with reference to FIGS. 4 to 6.

Figure 4:
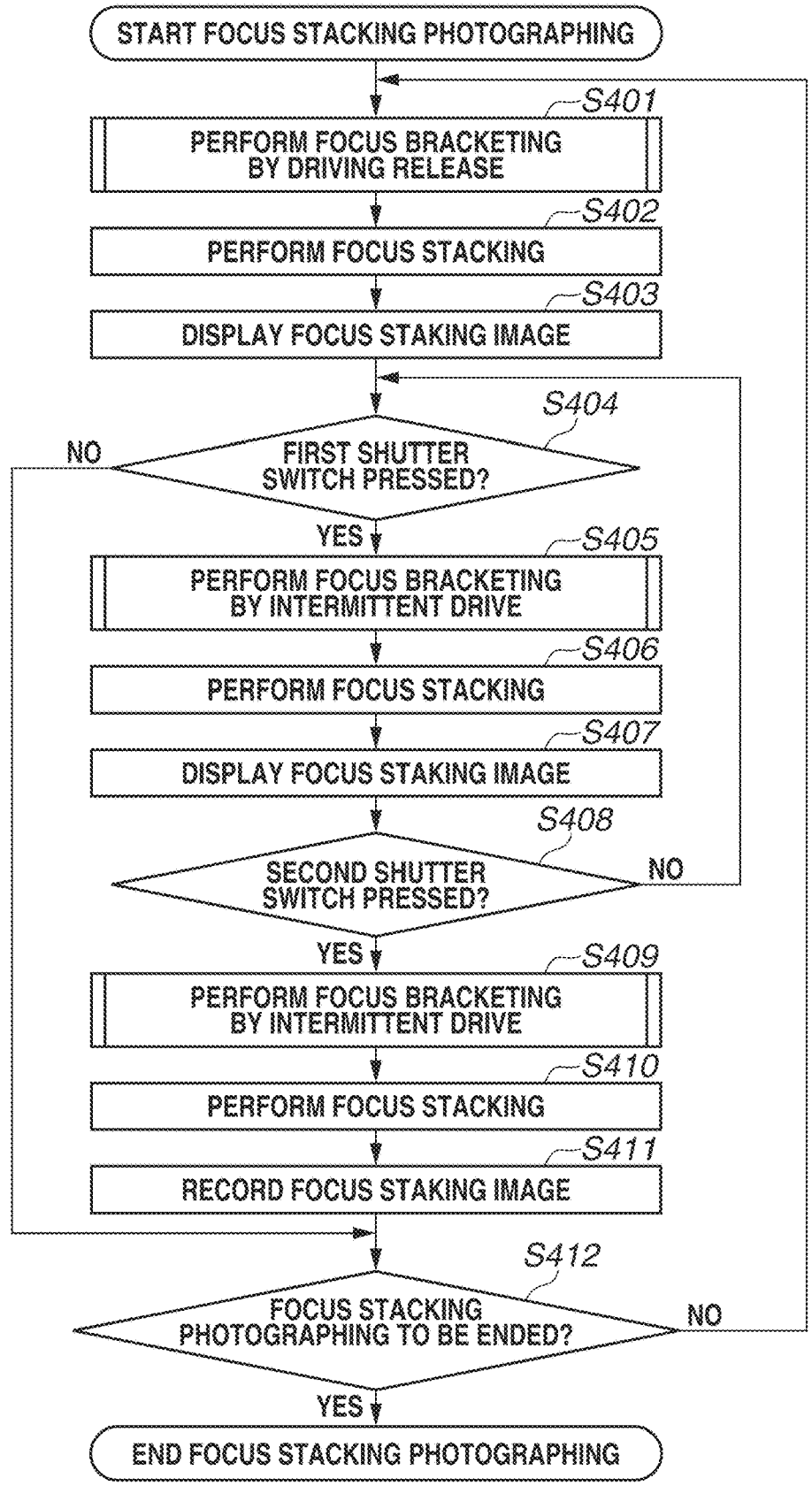
FIG. 4 is a flowchart illustrating a photographing operation according to the first exemplary embodiment.
Figure 5:
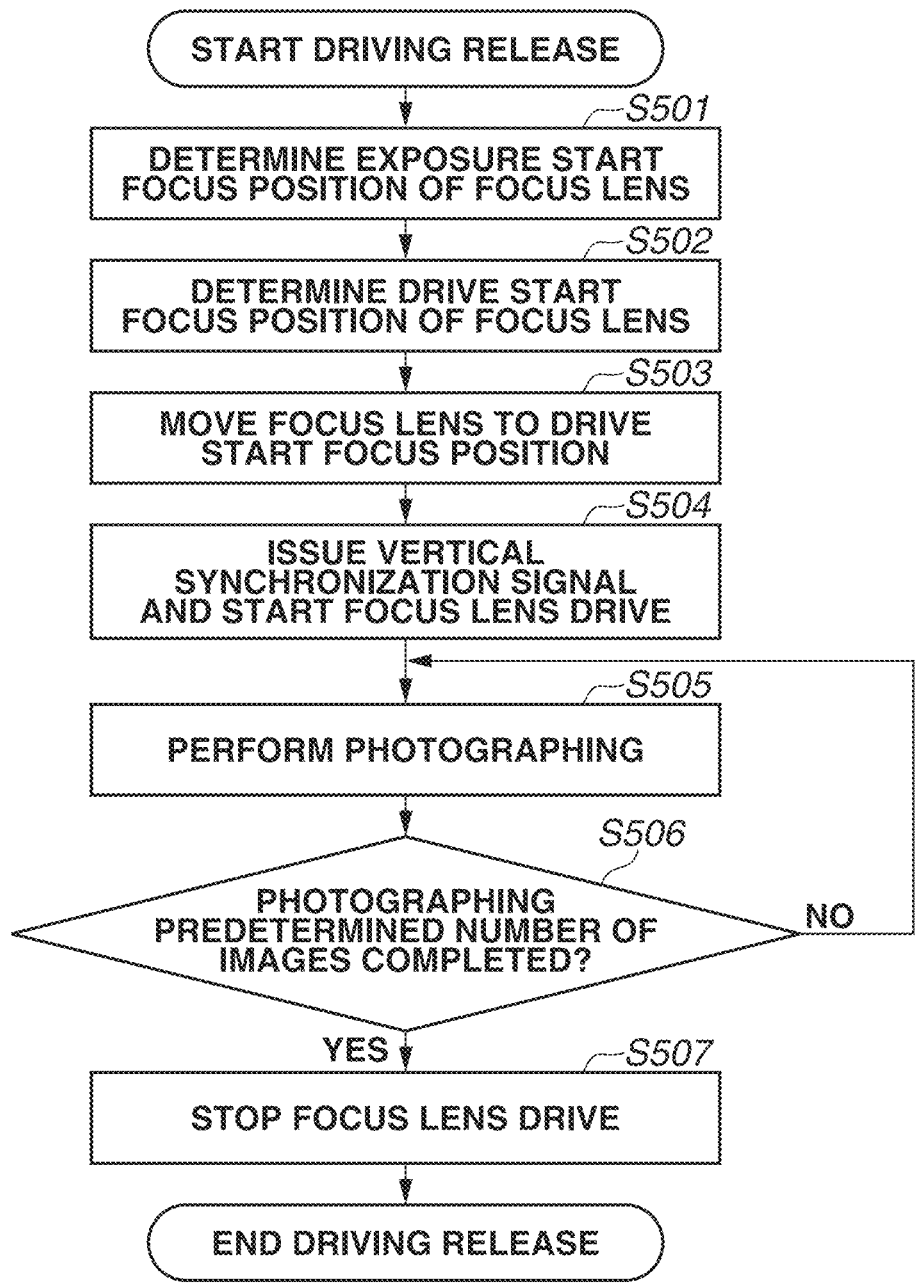
FIG. 5 is a flowchart illustrating a focus bracketing operation by driving release according to the first exemplary embodiment.
Figure 6:
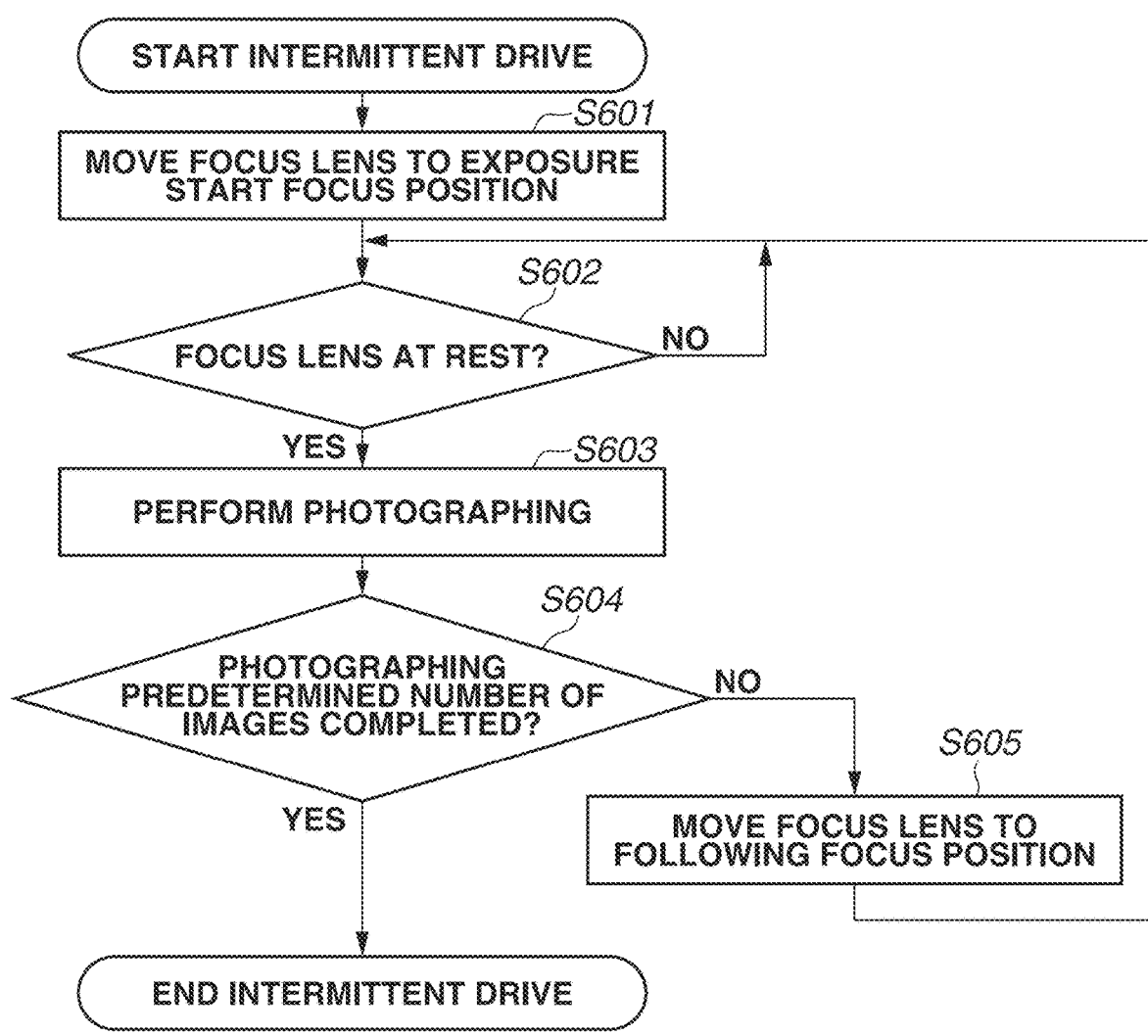
FIG. 6 is a flowchart illustrating a focus bracketing operation by intermittent drive according to the first exemplary embodiment.

Each step in the flowcharts illustrated in FIGS. 4 to 6 is operated by the system control unit 50 loading a program stored in the nonvolatile memory 56 into the system memory 52 and then executing the program.

An overall operation according to the present exemplary embodiment will be described with reference to FIG. 4. FIG. 4 is a flowchart illustrating a photographing operation according to the present exemplary embodiment.

The user's change of the power switch 72 or the mode selection switch 60 causes the system control unit 50 to receive an instruction for starting the focus stacking photographing mode and then start photographing operations according to the present exemplary embodiment.

In step S401, the system control unit 50 performs the focus bracketing by driving release. The operation will be described in detail below.

In step S402, the system control unit 50 subjects a plurality of images captured in the focus bracketing in step S401 to the focus stacking processing by the focus stacking unit 25.

In step S403, the system control unit 50 displays the focus stacking image obtained in step S402 on the display unit 28.

In step S404, the system control unit 50 determines whether the user is half-pressing the shutter button 61, i.e., the signal SW1 is being generated. If the system control unit 50 determines that the signal SW1 is being generated (YES in step S404), the processing proceeds to step S405. Otherwise (NO in step S404), the processing proceeds to step S412.

In step S405, the system control unit 50 performs the focus bracketing by intermittent drive. The operation will be described in detail below.

In step S406, the system control unit 50 performs similar processing to step S402; the system control unit 50 subjects the plurality of images captured in the focus bracketing in step S405 to the focus stacking processing by the focus stacking unit 25.

In step S407, the system control unit 50 performs similar processing to step S403; the system control unit 50 instructs the display unit 28 to display the focus stacking image obtained in step S406.

In step S408, the system control unit 50 determines whether the user is fully pressing the shutter button 61, i.e., the signal SW2 is being generated. If the system control unit 50 determines that the signal SW2 is being generated (YES in step S408), the processing proceeds to step S409. Otherwise (NO in step S408), the processing returns to step S404. Fully pressing the shutter button 61 by the user refers to issuing a photographing instruction.

In step S409, the system control unit 50 perform similar processing to step S405; the system control unit 50 performs the focus bracketing by intermittent drive.

In step S410, the system control unit 50 perform similar processing to steps S402 and S406; the system control unit 50 subjects the plurality of images captured in the focus bracketing in step S409 to the focus stacking processing by the focus stacking unit 25.

In step S411, the system control unit 50 records the focus stacking image obtained in step S410 in the recording medium 200.

In step S412, in response to the user's change of the power switch 72 or the mode selection switch 60, the system control unit 50 determines whether an instruction for ending the focus stacking photographing mode is received. If the instruction for ending the focus stacking photographing mode is not received (NO in step S412), the processing returns to step S401. If the instruction for ending the focus stacking photographing mode is received (YES in step S412), the processing exits from the processing following this flowchart.

The operation of the focus bracketing by driving release in step S401 will be described with reference to FIG. 5. FIG. 5 is a flowchart illustrating the operation of the focus bracketing by driving release according to the present exemplary embodiment.

In step S501, the system control unit 50 performs processing for determining the exposure start focus position. The exposure start focus position determined in step S501 refers to the closest distance focus position 201 in the forward path, or to the infinite distance focus position 202 in the return path.

In step S502, the system control unit 50 determines the drive start focus position of the focus lens 103.

In step S503, the system control unit 50 moves the focus lens 103 to the drive start focus position and the focus lens 103 becomes at rest. In step S504, the system control unit 50 issues a vertical synchronization signal to the imaging unit 22 and, at the same time, starts the drive of the focus lens 103.

In step S505, the imaging unit 22 performs the exposure and signal read operations in response to the vertical synchronization signal to generate a captured image.

In step S506, the system control unit 50 determines whether photographing a predetermined number of images for generating a focus stacking image is completed, i.e., whether the exposure and signal read operations of the image sensor have been performed a preset number of times. If the system control unit 50 determines that the photographing operation is not completed (NO in step S506), the processing returns to step S505. If the system control unit 50 determines that the photographing operation is completed (YES in step S506), the processing proceeds to step S507. In step S507, the system control unit 50 stops the drive of the focus lens 103. Then, the processing exits from the processing following this flowchart.

The operation of the focus bracketing by intermittent drive in steps S405 and S409 will be described with reference to FIG. 6. FIG. 6 is a flowchart illustrating the operation of the focus bracketing by intermittent drive according to the present exemplary embodiment.

In step S601, the system control unit 50 moves the focus lens 103 to the exposure start focus position determined in step S501.

In step S602, the system control unit 50 determines whether the focus lens 103 is at rest. If the system control unit 50 determines that the focus lens 103 is at rest (YES in step S602), the processing proceeds to step S603. In step S603, the system control unit 50 instructs the imaging unit 22 to generate a vertical synchronization signal. The imaging unit 22 performs the exposure and signal read operations in response to the vertical synchronization signal to generate a captured image.

In step S604, the system control unit 50 determines whether photographing the predetermined number of images for generating a focus stacking image is completed, i.e., whether the exposure and signal read operations of the image sensor have been performed the preset number of times. If the system control unit 50 determines that the photographing operation is not completed (NO in step S604), the processing returns to step S605. If the system control unit 50 determines that the photographing operation is completed (YES in step S604), the processing exits from the operation following this flowchart.

According to the present exemplary embodiment, upon the reception of the signal SW1 by the system control unit 50, the system control unit 50 repeats the reciprocating motion of the focus lens 103, making it possible to generate a live view image of the focus stacking image in a short time with an improved frame rate of the live view of the focus stacking image. At the same time, upon the reception of a photographing instruction by the digital camera 100, the system control unit 50 performs the focus bracketing by intermittent drive to capture images for generating a focus stacking image to be recorded in the recording medium 200.

A second exemplary embodiment will be described. According to the second exemplary embodiment, unlike the first exemplary embodiment, the system control unit 50 displays a focus stacking image live view if the system control unit 50 receives the signal SW1, or immediately displays the normal live view if the signal SW1 generation is stopped. The present exemplary embodiment will be described centering on differences from the first exemplary embodiment.

Figure 7:
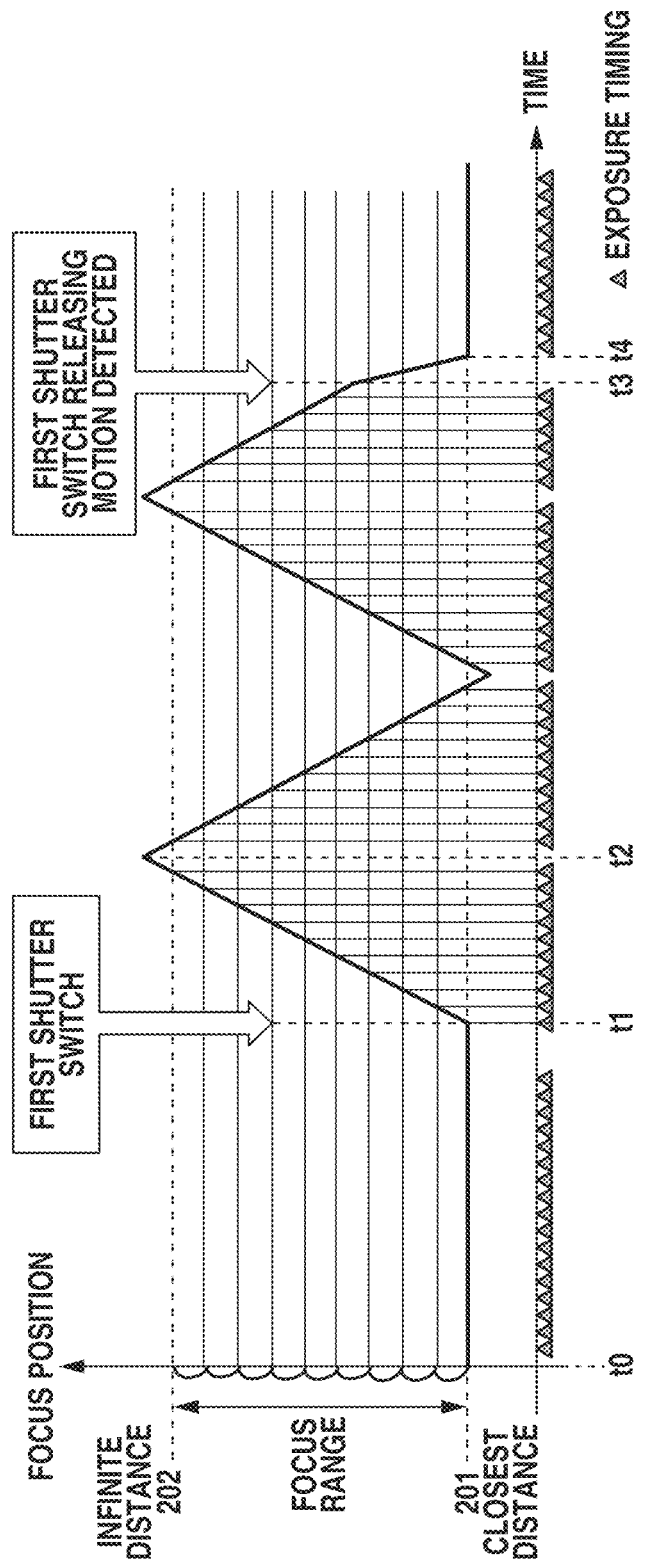
FIG. 7 illustrates a photographing operation according to a second exemplary embodiment.

FIG. 7 illustrates a photographing operation according to the present exemplary embodiment.

At time t0, the user is not pressing the shutter button 61; neither the signal SW1 nor SW2 is being generated. In this state, the system control unit 50 performs photographing with the focus lens 103 fixed to the drive start focus position at the closest distance. At the same time, the system control unit 50 instructs the display unit 28 to display the captured image.

At time t1, the user is half-pressing the shutter button 61 to generate the signal SW1. Then, the system control unit 50 starts the drive of the focus lens 103. During the period from time t1 to time t2, the drive of the focus lens 103 by driving release is similar to the drive according to the first exemplary embodiment.

At time t3, the user stops half-pressing the shutter button 61 not to generate the signal SW1. Alternatively, the system control unit 50 detects motion between frames via the motion detection unit 26. At this timing, the imaging unit 22 is in the middle of the return path operation during the generation period of the signal SW1, and hence has not yet captured all of the 10 images for generating a focus stacking image. However, since the user immediately selects the live view display, the system control unit 50 completes photographing, moves the focus lens 103 to the closest distance focus position 201 and then stops it. In this case, the system control unit 50 may move the focus lens 103 to the infinite distance focus position 202.

At time t4, the focus lens 103 stops. Then, the system control unit 50 performs photographing at a fixed focus position, and instructs the display unit 28 to display the captured image. The motion setting of the focus lens 103 from time t3 to time t4 may be faster than that from time t1 to time t2.

Figure 8:
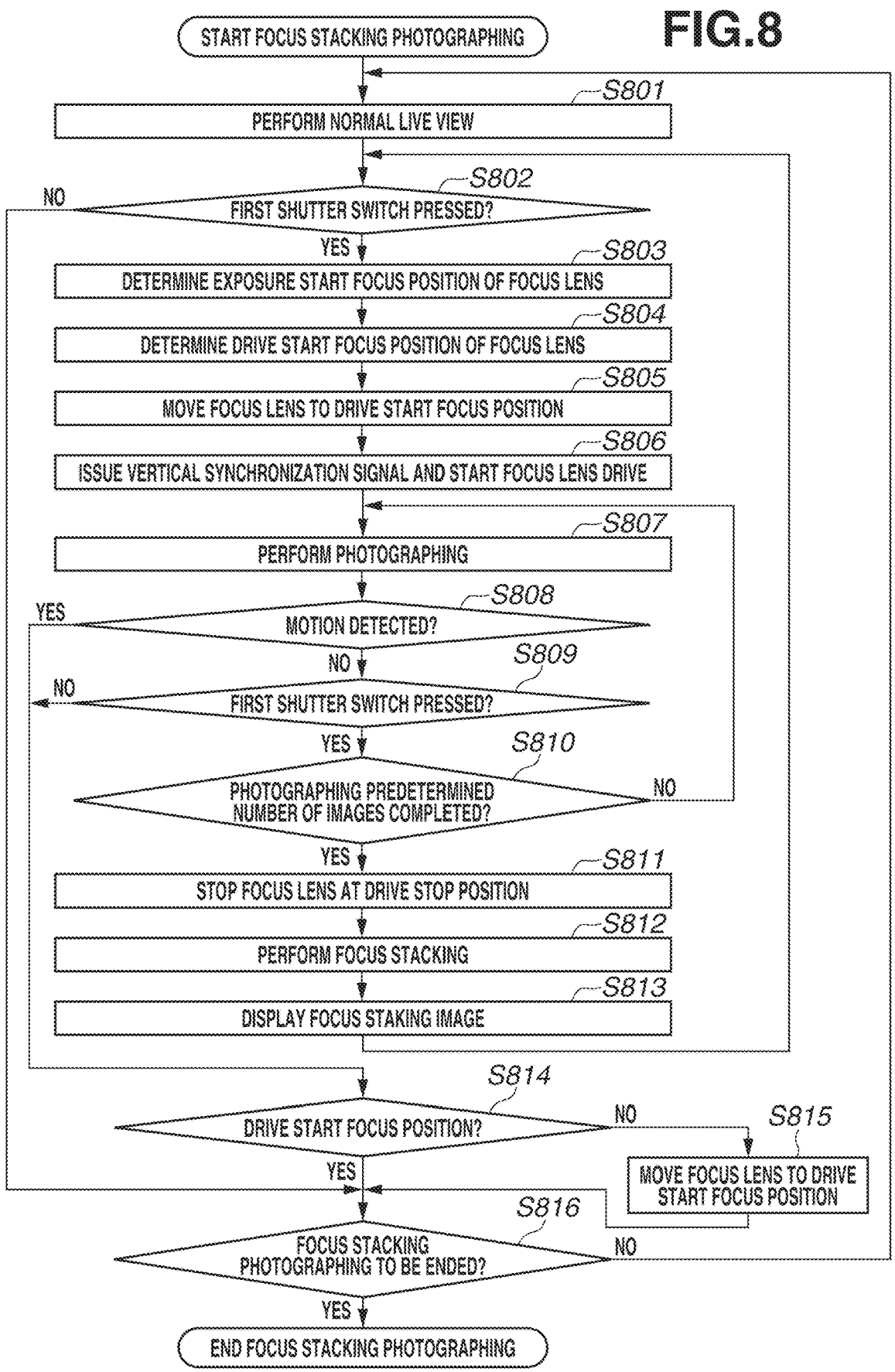
FIG. 8 is a flowchart illustrating a live view switching operation according to the second exemplary embodiment.

FIG. 8 is a flowchart illustrating a live view switching operation according to the present exemplary embodiment.

Each piece of processing illustrated in FIG. 8 is carried out by the system control unit 50 loading a program stored in the nonvolatile memory 56 into the system memory 52 and then executing the program.

In response to the user's change of the power switch 72 or the mode selection switch 60, the system control unit 50 receives an instruction for starting the focus stacking photographing mode and then starts the processing illustrated in FIG. 8.

In step S801, the system control unit 50 fixes the focus lens 103 at the closest distance focus position 201 and then performs the normal live view photographing.

In step S802, the system control unit 50 determines whether the user is half-pressing the shutter button 61 to generate the signal SW1. If the system control unit 50 determines that the signal SW1 is being generated (YES in step S802), the processing proceeds to step S803. Otherwise (NO in step S802), the processing proceeds to step S816.

In step S803, the system control unit 50 determines the exposure start focus position of the focus lens 103. The exposure start focus position refers to the closest distance focus position 201 in the forward path, or to the infinite distance focus position 202 in the return path.

In step S804, the system control unit 50 determines the drive start focus position of the focus lens 103.

In step S805, the system control unit 50 moves the focus lens 103 to the drive start focus position and then stops it.

In step S806, the system control unit 50 issue a vertical synchronization signal to the imaging unit 22 and, at the same time, starts the drive of the focus lens 103.

In step S807, the imaging unit 22 performs the exposure and signal read operations in response to the vertical synchronization signal to generate a captured image.

In step S808, the system control unit 50 determines whether the motion detection unit 26 detects the subject's motion. If motion is detected (YES in step S808), the processing proceeds to step S814. Otherwise (NO in step S808), the processing proceeds to step S809. The processing in step S808 is intended to prevent the focus stacking image live view with inferior quality from being displayed if the subject moves. If the focus stacking image live view is to be displayed even with the subject being not at rest, the processing in step S808 can be omitted.

In step S809, the system control unit 50 determines whether the user is half-pressing the shutter button 61 to generate the signal SW1. If the system control unit 50 determines that the signal SW1 is being generated (YES in step S809), the processing proceeds to step S810. Otherwise (NO in step S809), the processing proceeds to step S814.

In step S810, the system control unit 50 determines whether photographing the predetermined number of images for generating a focus stacking image is completed. If the system control unit 50 determines that the photographing operation is completed (YES in step S810), the processing proceeds to step S811. Otherwise (NO in step S810), the processing returns to step S807. In step S807, the system control unit 50 performs the photographing operation.

In step S811, the system control unit 50 stops the focus lens 103 at the drive stop position. The drive stop position in the forward path refers to the drive start focus position in the following return path, and the drive stop position in the return path refers to the drive start focus position in the following forward path.

In step S812, the system control unit 50 subjects the plurality of images captured in the photographing operation in steps S807 to S811 to the focus stacking processing by the focus stacking unit 25.

In step S813, the system control unit 50 instructs the display unit 28 to display the focus stacking image obtained in step S812. After displaying the focus stacking image on the display unit 28, the processing returns to step S802. In step S802, the system control unit 50 determines whether the signal SW1 is being generated.

In step S814, the system control unit 50 determines whether the focus lens 103 is at the drive start focus position in a state where the motion detection unit 26 detects motion in step S808 or a state where the signal SW1 is not generated in step S809. If the focus lens 103 is at the drive start focus position (YES in step S814), the processing proceeds to step S816. Otherwise (NO in step S814), the processing proceeds to step S815.

In step S815, the system control unit 50 moves the focus lens 103 to the drive start focus position and then stops it.

In step S816, in response to the user's change of the power switch 72 or the mode selection switch 60, the system control unit 50 determines whether an instruction for ending the focus stacking photographing mode is received. If the instruction for ending the focus stacking photographing mode is not received (NO in step S816), the processing returns to step S801. If the instruction for ending the focus stacking photographing mode is received (YES in step S816), the processing exits from the processing following this flowchart.

According to the present exemplary embodiment, the system control unit 50 displays the focus stacking image live view upon the reception of the signal SW1, or immediately displays the normal live view with no reception of the signal SW1, enabling the user to check a desired image. Upon the detection of motion by the motion detection unit 26, the system control unit 50 switches the focus stacking image live view to the normal live view to display a still image, enabling the user to immediately check the subject and composition.

A third exemplary embodiment will be described. According to the third exemplary embodiment, unlike the second exemplary embodiment, when the user stops pressing the first shutter switch 64, the system control unit 50 does not always stop the focus lens 103 at the drive start focus position, but stops at other focus positions so that the focus lens 103 stops as soon as possible. Specific processing will be described below.

The present exemplary embodiment will be described centering on differences from the first and the second exemplary embodiments.

The operation sequence of the focus lens 103 and the imaging unit 22 with the horizontal axis representing time and the vertical axis representing focus positions will be described with reference to FIGS. 9A, 9B, 10, and 11.

Figure 10:
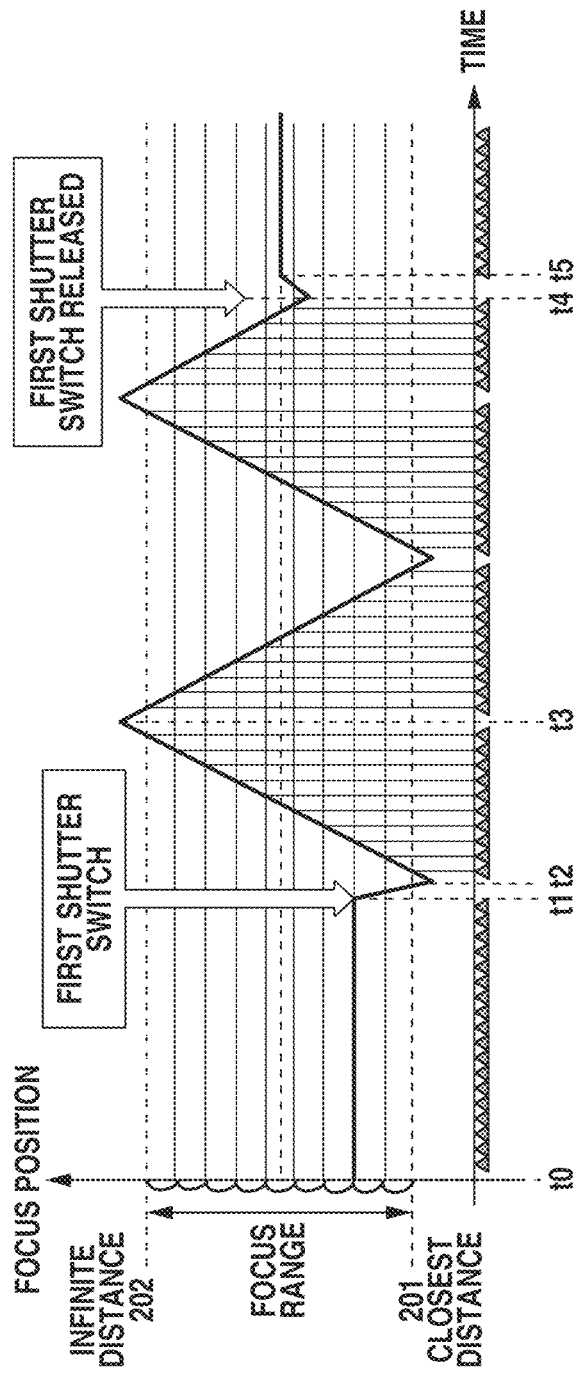
FIG. 10 illustrates another operation from a state where the signal SW1 is not generated to a state where the signal SW1 is being generated according to the third exemplary embodiment.
Figure 11:
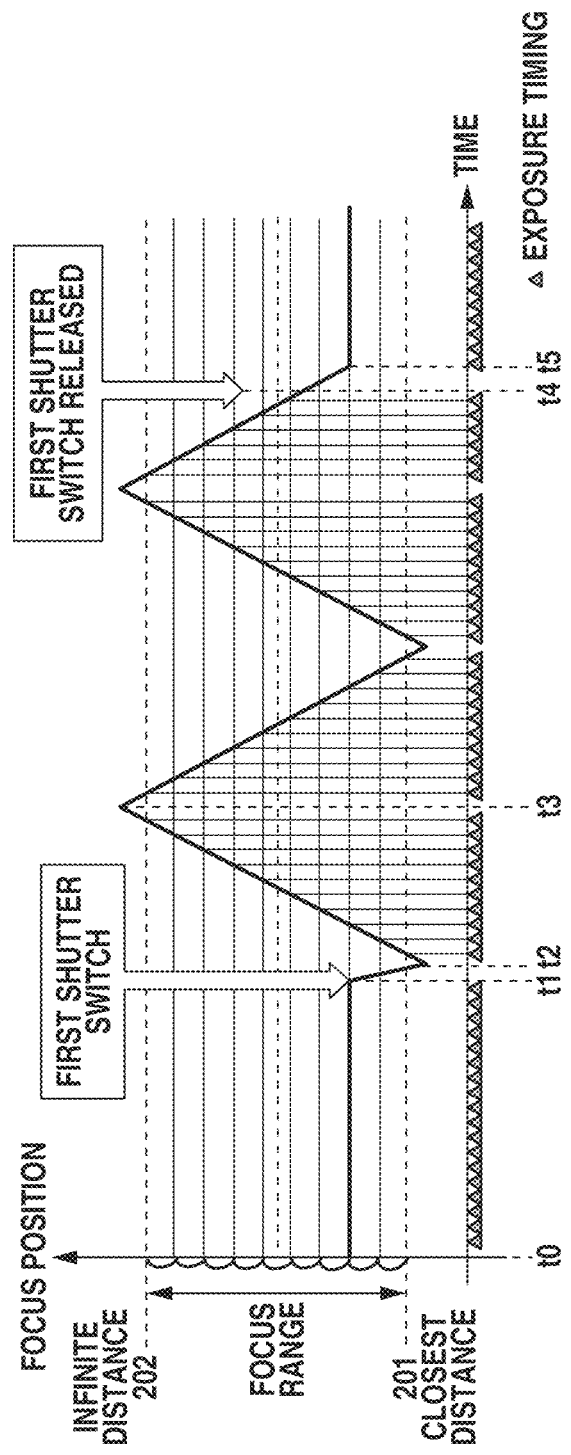
FIG. 11 illustrates still another operation from a state where the signal SW1 is not generated to a state where the signal SW1 is being generated according to the third exemplary embodiment.

FIGS. 9A and 9B illustrate operations in a state where the user is half-pressing the shutter button 61, that is, in the state changing from no generation to generation of the signal SW1, according to the present exemplary embodiment. FIG. 9A illustrates an example of starting the drive at a focus position closer than the closest distance, and FIG. 9B illustrates an example of starting the drive at a focus position farther than the infinite distance. FIGS. 10 and 11 illustrate other examples of the operation in a state changing from no generation to generation of the signal SW1 according to the present exemplary embodiment.

At time t0, the user is not pressing the shutter button 61; the signal SW1 or SW2 is not generated. The system control unit 50 performs photographing with the focus lens 103 fixed to any focus position in the focus range. At the same time, the system control unit 50 instructs the display unit 28 to display a captured image.

At time t1, upon the generation of the signal SW1 by the user's half-pressing the shutter button 61, the system control unit 50 moves the focus lens 103 to the drive start focus position. The drive start focus position is different between FIGS. 9A and 9B. If the focus position of the focus lens 103 at time t1 is at a position nearer the closest distance in the focus range, as illustrated in FIG. 9A, the system control unit 50 determines the drive start focus position at the closest distance. Likewise, when the focus position of the focus lens 103 at time t1 is at a position nearer the infinite distance in the focus range, as illustrated in FIG. 9B, the system control unit 50 determines the drive start focus position at the infinite distance.

At time t2, the system control unit 50 moves the focus lens 103 to the drive start focus position determined at time t1. Like the first exemplary embodiment, the drive start focus position is assumed to be at a position closer than the closest distance focus position 201. Upon the stop of the focus lens 103, the system control unit 50 starts the drive of driving release. During the period from time t2 to time t3, the drive of the focus lens 103 by driving release is similar to that according to the first exemplary embodiment.

The operation sequence performed when the user stops half-pressing the shutter button 61, that is, when the generation of the signal SW1 is stopped, will be described with reference to FIGS. 9A, 9B, 10, and 11. FIGS. 9A, 9B, 10, and 11 are common in the operation when the shutter button 61 is being half-pressed and differ in the drive of the focus lens 103 when the user stops half-pressing the shutter button 61.

Referring to FIGS. 9A, 9B, 10, and 11, at time t4, the user stops half-pressing the shutter button 61 not to generate the signal SW1. Although the imaging unit 22 has not yet captured all of the 10 images for generating a focus stacking image, the system control unit 50 ends photographing and changes the drive of the focus lens 103.

At time t4 illustrated in FIGS. 9A and 9B, the system control unit 50 stops the focus lens 103 at the current focus position.

Referring to FIG. 10, at time t4, the system control unit 50 stops the drive of the focus lens 103. Then, the system control unit 50 moves the focus lens 103 to an intermediate focus position in the focus range. At time t5, the focus lens 103 reaches the intermediate focus position. Then, the system control unit 50 stops the drive.

Referring to FIG. 11, at time t4, the system control unit 50 changes the drive of the focus lens 103 from the driving release and then moves the focus lens 103 to the focus position at time t1. At time t5, the focus lens 103 reaches the focus position at time t1. Then, the system control unit 50 stops the drive.

At time t4 and after illustrated in FIGS. 9A and 9B, at time t5 and after illustrated in FIG. 10, and at time t5 and after illustrated in FIG. 11, the focus lens 103 stops. Then, the system control unit 50 performs photographing at a fixed focus position, and instructs the display unit 28 to display the captured image.

Figure 12:
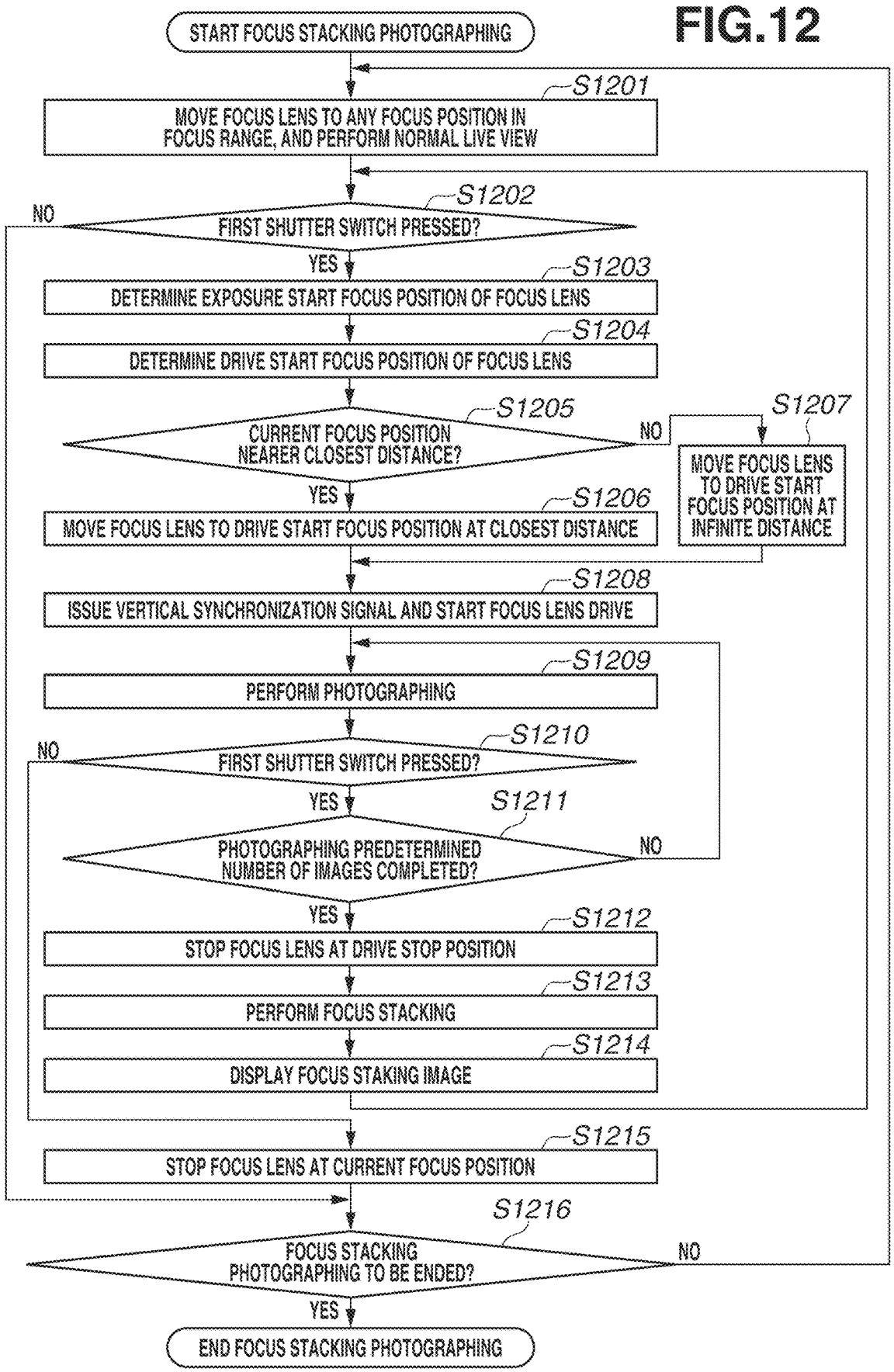
FIG. 12 is a flowchart illustrating the photographing operations illustrated in FIGS. 9A and 9B according to the third exemplary embodiment.
Figure 13:
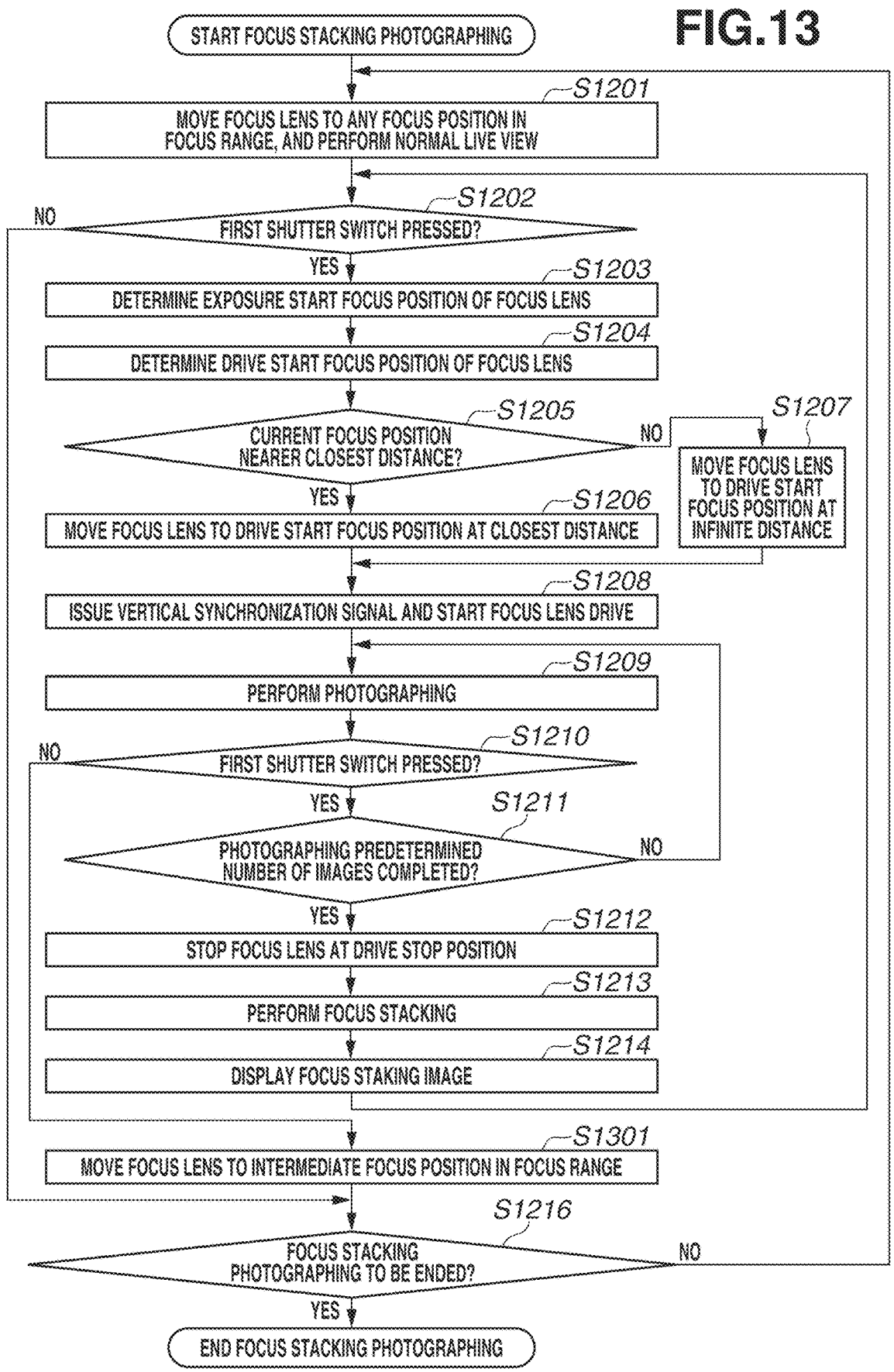
FIG. 13 is a flowchart illustrating the photographing operation illustrated in FIG. 10 according to the third exemplary embodiment.
Figure 14:
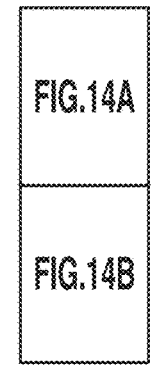
FIG. 14 including

Flowcharts for the live view switching operations illustrated in FIGS. 9A and 9B, 10, and 11 will be described with reference to the accompanying drawings. FIGS. 12, 13, and 14 are flowcharts illustrating the photographing operations illustrated in FIGS. 9A and 9B, 10, and 11, respectively.

Each step process in the flowcharts illustrated in FIGS. 12, 13, and 14 is operated by the system control unit 50 loading a program stored in the nonvolatile memory 56 into the system memory 52 and then executing the program.

The photographing operations illustrated in FIGS. 9A and 9B will be described with reference to the flowchart illustrated in FIG. 12.

Upon the user's change of the power switch 72 or the mode selection switch 60, the system control unit 50 receives an instruction for starting the focus stacking photographing mode and then starts the processing illustrated in FIG. 12.

In step S1201, the system control unit 50 fixes the focus lens 103 to any focus position in the focus range and performs the normal live view photographing.

In step S1202, the system control unit 50 determines whether the user is half-pressing the shutter button 61 to generate the signal SW1. If the system control unit 50 determines that the signal SW1 is being generated (YES in step S1202), the processing proceeds to step S1203. Otherwise (NO in step S1202), the processing proceeds to step S1216.

In step S1203, the system control unit 50 determines the exposure start focus position of the focus lens 103. The exposure start focus position refers to the closest distance focus position 201 in the forward path, or to the infinite distance focus position 202 in the return path.

In step S1204, the system control unit 50 determines the drive start focus position of the focus lens 103.

In step S1205, the system control unit 50 determines whether the current focus position of the focus lens 103 is at a position nearer the closest distance or the infinite distance in the focus range. If the system control unit 50 determines that the current focus position is nearer the closest distance (YES in step S1205), the processing proceeds to step S1206. If the system control unit 50 determines that the current focus position is nearer the infinite distance (NO in step S1205), the processing proceeds to step S1207.

In step S1206, the system control unit 50 moves the focus lens 103 positioned nearer the closest distance in the focus range to the drive start focus position at the closest distance and then stops it.

In step S1207, the system control unit 50 moves the focus lens 103 positioned nearer the infinite distance in the focus range to the drive start focus position at the infinite distance and then stops it.

In step S1208, the system control unit 50 issues a vertical synchronization signal to the imaging unit 22 and, at the same time, starts the drive of the focus lens 103.

In step S1209, the imaging unit 22 performs the exposure and signal read operations in response to the vertical synchronization signal to generate a captured image.

In step S1210, the system control unit 50 determines whether the user is half-pressing the shutter button 61 to generate the signal SW1. If the system control unit 50 determines that the signal SW1 is being generated (YES in step S1210), the processing proceeds to step S1211. Otherwise (NO in step S1210), the processing proceeds to step S1215.

In step S1211, the system control unit 50 determines whether photographing the predetermined number of images for generating a focus stacking image is completed. If the system control unit 50 determines that the photographing operation is completed (YES in step S1211), the processing proceeds to step S1212. Otherwise (NO in step S1211), the processing returns to step S1209. In step S1209, the system control unit 50 performs the photographing operation.

In step S1212, the system control unit 50 stops the focus lens 103 at the drive stop position. The drive stop position in the forward path refers to the drive start focus position in the following return path, and the drive stop position in the return path refers to the drive start focus position in the following forward path.

In step S1213, the system control unit 50 subjects the plurality of images captured in the photographing operation in steps S1209 to S1212 to the focus stacking processing by the focus stacking unit 25.

In step S1214, the system control unit 50 instructs the display unit 28 to display the focus stacking image obtained in step S1213. After displaying the focus stacking image in the display unit 28, the processing returns to in step S1202. In step S1202, the system control unit 50 determines whether the signal SW1 is being generated.

In step S1215, in response to the system control unit 50's determination that the generation of the signal SW1 is stopped in step S1210, the system control unit 50 stops the focus lens 103 at the current focus position.

In step S1216, upon the user's change of the power switch 72 or the mode selection switch 60, the system control unit 50 determines whether an instruction for ending the focus stacking photographing mode is received. If the instruction for ending the focus stacking photographing mode is not received (NO in step S1216), the processing returns to step S1201. If the instruction for ending the focus stacking photographing mode is received (YES in step S1216), the processing exits from the processing following the flowchart illustrated in FIG. 12.

The photographing operation illustrated in FIG. 10 will be described with reference to the flowchart illustrated in FIG. 13.

The processing in steps S1201 to S1214 and S1216 in the operation illustrated in FIG. 13 is similar to the relevant processing in the flowchart illustrated in FIG. 12, and redundant descriptions thereof will be omitted.

In step S1301, in response to the system control unit 50's determination that the generation of the signal SW1 is stopped, the system control unit 50 moves the focus lens 103 to the intermediate focus position in the focus range.

Figure 14A:
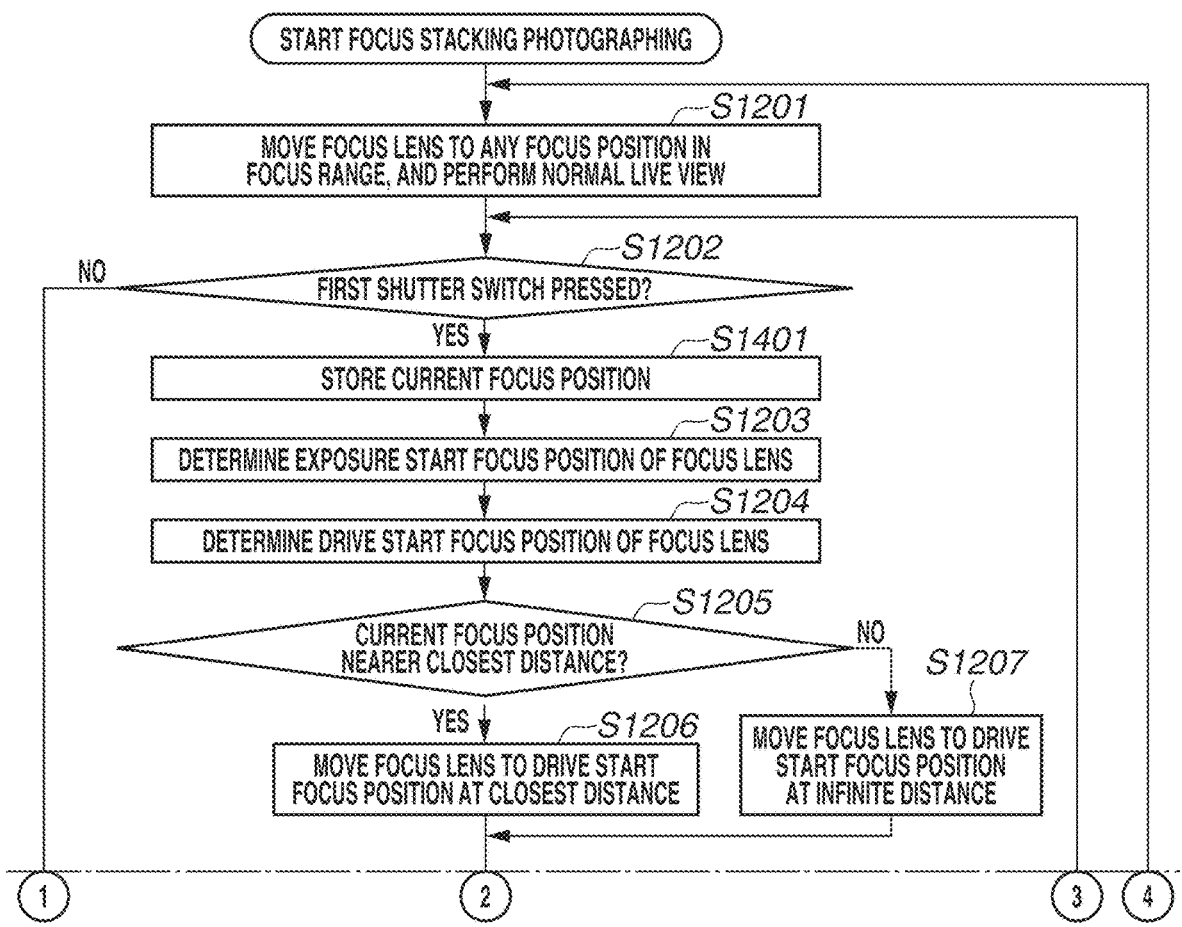
FIGS. 14A and 14B are a flowchart illustrating the photographing operation illustrated in FIG. 11 according to the third exemplary embodiment.
Figure 14B:
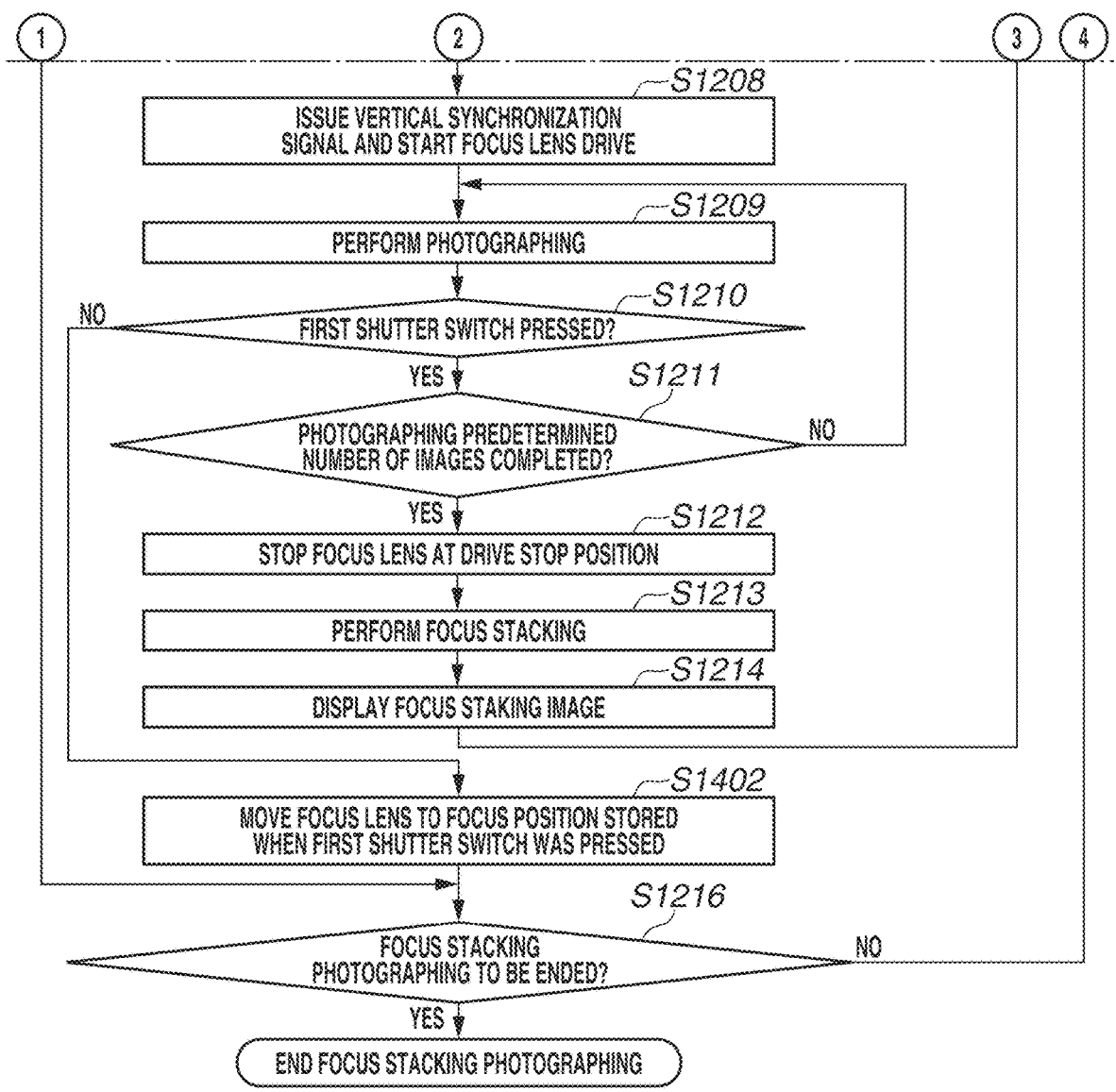

The photographing operation illustrated in FIG. 11 will be described with reference to the flowchart illustrated in FIG. 14 (FIGS. 14A and 14B).

The processing in steps S1201 to S1214 and S1216 in the operation illustrated in FIG. 14 (FIGS. 14A and 14B) is similar to the relevant processing in the flowchart illustrated in FIG. 12, and redundant descriptions thereof will be omitted.

In step S1401, the system control unit 50 stores the focus position of the focus lens 103 at the time that the signal SW1 is being generated, in the system memory 52.

In step S1402, in response to the system control unit 50's determination that the generation of the signal SW1 is stopped in step S1210, the system control unit 50 moves the focus lens 103 to the focus position when the signal SW1 was generated, stored in the system memory 52.

According to the present exemplary embodiment, when the generation of the signal SW1 is stopped, the system control unit 50 can display the live view image intended by the user, by controlling the focus position. More specifically, in the operations illustrated in FIGS. 9A and 9B, the system control unit 50 stops the drive of the focus lens 103 at the focus position where the generation of the signal SW1 is stopped, making it possible to more quickly return to the live view at a fixed focus position. In the operation illustrated in FIG. 10, the system control unit 50 stops the drive of the focus lens 103 at the intermediate focus position in the focus range, making it possible to display a comparatively in-focus image of the entire subject 203 in the live view at a fixed focus position. In the operation illustrated in FIG. 11, the system control unit 50 memorizes the focus position at which the signal SW1 is received, making it possible to display at a constant focus position during the period of the live view at a fixed focus position.

A fourth exemplary embodiment will be described. According to the fourth exemplary embodiment, unlike the first exemplary embodiment, the system control unit 50 performs the focus stacking processing on the assumption that the subject moves during photographing. The present exemplary embodiment will be described centering on differences from the first exemplary embodiment.

Figure 15:
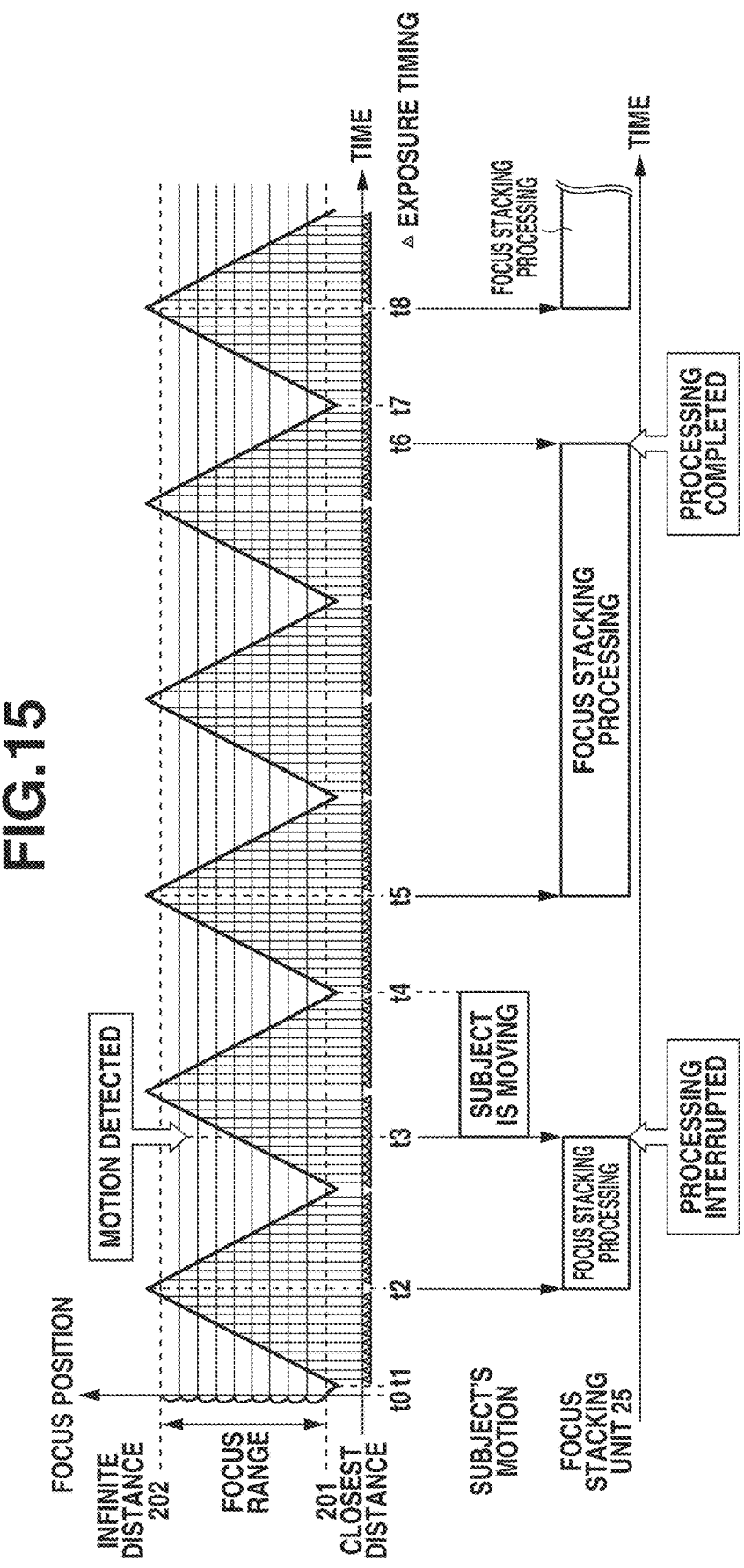
FIG. 15 illustrates a photographing operation according to a fourth exemplary embodiment.

FIG. 15 illustrates the photographing operation according to the present exemplary embodiment.

The operation sequence of the focus lens 103 and the imaging unit 22, with the horizontal axis representing time and the vertical axis representing focus positions, will be described with reference to FIG. 15.

The operation during the period from time t0 to time t2 is similar to the operation according to the first exemplary embodiment.

At time t2, the system control unit 50 instructs the focus stacking unit 25 to start the focus stacking processing.

At time t2, the motion detection unit 26 detects motion of the subject and notifies the system control unit 50 of the motion. Upon reception of the notification from the motion detection unit 26, the system control unit 50 instructs the focus stacking unit 25 to interrupt the focus stacking processing.

During the period from time t3 to time t4, the motion detection unit 26 detects motion of the subject and notifies the system control unit 50 of the motion. Upon reception of the notification from the motion detection unit 26, the system control unit 50 instructs the focus stacking unit 25 to suspend the focus stacking processing.

During the period from time t4 to time t5 as the period in the forward path following time t3 at the time that the subject's motion stops, the system control unit 50 determines that the subject is not moving based on the motion detection result by the motion detection unit 26. Thus, the system control unit 50 determines that 10 suitable images free from the subject's motion to obtain a focus stacking image have been captured.

At time t5, the system control unit 50 instructs the focus stacking unit 25 to start the focus stacking processing.

At time t6, the focus stacking unit 25 notifies the system control unit 50 that a focus stacking image has been generated based on the 10 images.

During the period from time t7 to time t8, the system control unit 50 determines that the subject is not moving based on the motion detection result by the motion detection unit 26.

At time t8, the system control unit 50 instructs the focus stacking unit 25 to start the focus stacking processing.

Figure 16:
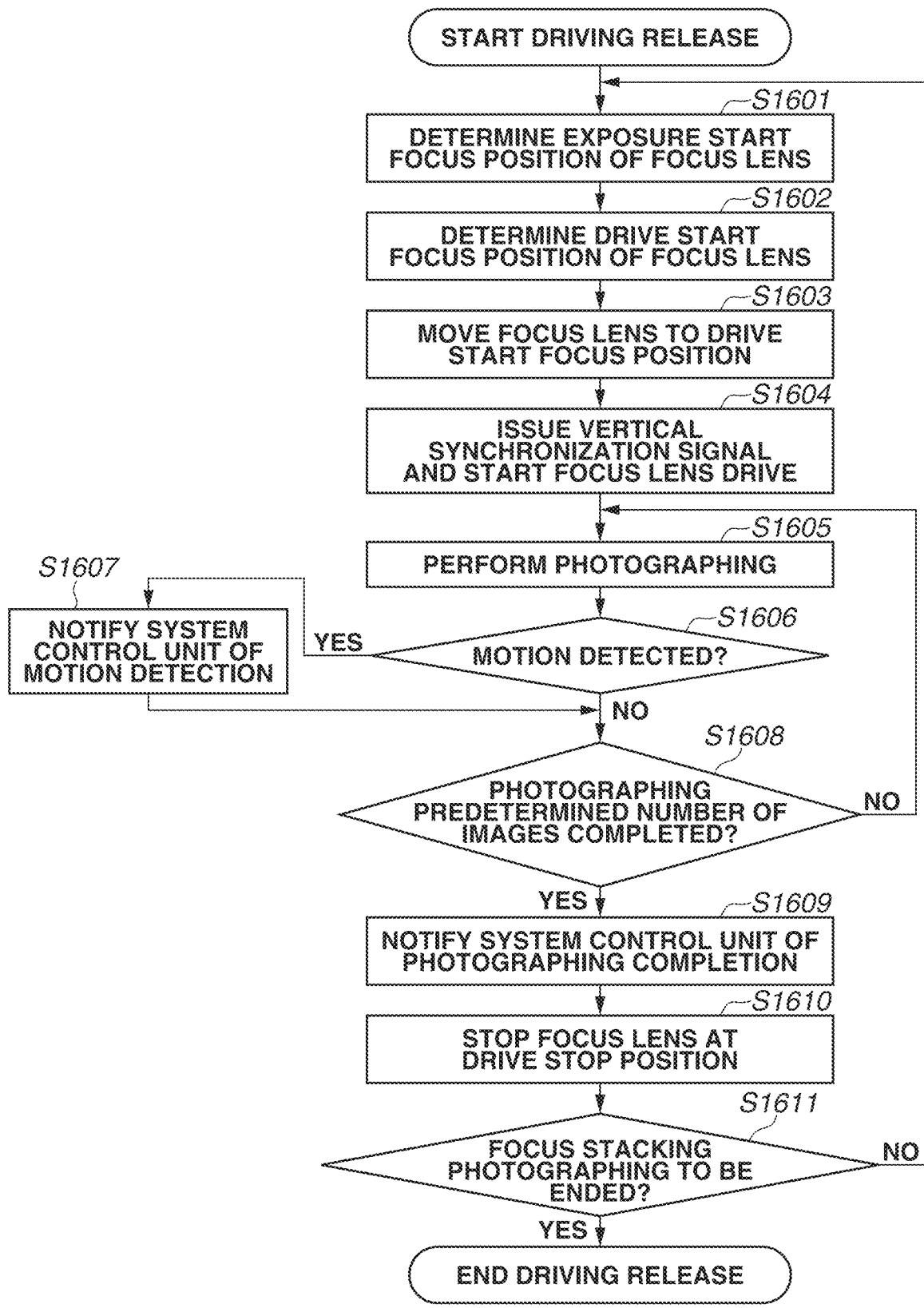
FIG. 16 is a flowchart illustrating a focus bracketing by driving release according to the fourth exemplary embodiment.

A photographing operation according to the present exemplary embodiment will be described with reference to FIGS. 16 and 17. Each step process of the flowcharts illustrated in FIGS. 16 and 17 is operated by the system control unit 50 loading a program stored in the nonvolatile memory 56 into the system memory 52 and then executing the program. The operations illustrated in FIGS. 16 and 17 are performed in parallel via the system control unit 50.

FIG. 16 is a flowchart illustrating the operation of the focus bracketing by driving release according to the present exemplary embodiment.

Processing in steps S1601 to S1605 is similar to the processing in steps S501 to S505, respectively, where the system control unit 50 controls the focus lens 103 and performs the photographing processing.

Processing in step S1606 is similar to the processing in step S808, where the motion detection unit 26 detects the subject's motion. If the subject's motion is detected (YES in step S1606), the processing proceeds to step S1607. Otherwise (NO in step S1606), the processing proceeds to step S1608.

In step S1607, the system control unit 50 receives a motion detection notification from the motion detection unit 26.

In step S1608, the system control unit 50 determines whether photographing the predetermined number of images for generating a focus stacking image is completed. If the system control unit 50 determines that the photographing operation is completed (YES in step S1608), the processing proceeds to step S1609. Otherwise (NO in step S1608), the processing returns to step S1605. In step S1605, the system control unit 50 performs the photographing operation.

In step S1609, the system control unit 50 receives a photographing operation completion notification from the imaging unit 22.

In step S1610, the system control unit 50 stops the focus lens 103 at the drive stop position. The drive stop position in the forward path refers to the drive start focus position in the following return path, and the drive stop position in the return path refers to the drive start focus position in the following forward path.

In step S1611, upon the user's change of the power switch 72 or the mode selection switch 60, the system control unit 50 determines whether an instruction for ending the driving release is received. If the instruction for ending the driving release mode is not received (NO in step S1611), the processing returns to step S1601. If the instruction for ending the driving release mode is received (YES in step S1611), the processing exits from the processing following the flowchart illustrated in FIG. 16.

FIG. 17 is a flowchart illustrating the focus stacking processing according to the present exemplary embodiment.

In step S1701, the system control unit 50 waits for completion of photographing by the imaging unit 22 notified of in step S1609. The processing repeats step S1701 until the system control unit 50 receives a photographing completion notification. If the system control unit 50 receives the photographing completion notification (YES in step S1701), the processing proceeds to step S1702.

In step S1702, the system control unit 50 receives the motion detection result by the motion detection unit 26 notified of in step S1607. If the subject's motion is not detected (NO in step S1702), the processing proceeds to step S1704. If the subject's motion is detected (YES in step S1702), the processing proceeds to step S1703.

In step S1703, the system control unit 50 instructs the focus stacking unit 25 to interrupt the processing. Then, the processing proceeds to step S1706.

In step S1704, the system control unit 50 instructs the focus stacking unit 25 to subject the plurality of images captured in the photographing processing from step S1605 to step S1610 to the focus stacking processing.

In step S1705, the system control unit 50 determines whether the focus stacking unit 25 has completed the focus stacking processing on the predetermined number of images. If the focus stacking processing is not completed on the predetermined number of images (NO in step S1705), the processing returns to step S1702. If the focus stacking processing is completed on the predetermined number of images (YES in step S1705), the processing proceeds to step S1706.

In step S1706, upon the user's change of the power switch 72 or the mode selection switch 60, the system control unit 50 determines whether an instruction for ending the driving release is received. If the instruction for ending the driving release mode is not received (NO in step S1706), the processing returns to step S1701. If the instruction for ending the driving release mode is received (YES in step S1706), the processing exits from the processing following this flowchart.

The detection of the subject's motion according to the present exemplary embodiment will be described.

FIG. 18 illustrates the subject's motion detection using images at adjacent focus positions according to the present exemplary embodiment.

Like the first exemplary embodiment, in the focus bracketing by driving release, the imaging unit 22 repeats the forward path operation started from time t1 and the return path operation started from time t2.

The motion detection unit 26 performs the subject's motion detection by using captured images at adjacent focus positions. More specifically, in the forward path started from time t1, the system control unit 50 performs the motion detection processing by using a pair of the image captured at a focus position F1 and the image captured at a focus position F2, and by using a pair of the image captured at the focus position F2 and the image captured at a focus position F3, according to the movement of the focus position. Subsequently, the system control unit 50 repeats similar motion detection processing on up to a pair of the image captured at a focus position F9 and the image captured at a focus position F10. In the return path started from time t2, like the forward path, the motion detection unit 26 repeats the subject's motion detection processing by using captured images at adjacent focus positions according to the movement of the focus position (detailed descriptions will be omitted).

In the above-described processing, performing the motion detection by using images at adjacent focus positions enables the motion detection at a high frame rate, making it possible to improve the responsiveness in processing based on the motion detection.

FIG. 19 illustrates the subject's motion detection by using images at the same focus positions according to the present exemplary embodiment. The operation of the focus bracketing by driving release is similar to the operation illustrated in FIG. 18.

The motion detection unit 26 performs the subject's motion detection by using captured images at the same focus positions. In the example below, the motion detection is performed by using images captured at the same focus positions in forward paths. More specifically, the system control unit 50 performs the motion detection by using a pair of the image captured at the focus position F1 in the forward path started from time t1 and the image captured at a focus position F11 in the forward path started from time t3, and subsequently repeats similar motion detection processing by using up to a pair of the image captured at the focus position F10 and the image captured at a focus position F20.

Although descriptions will be omitted, the system control unit 50 may use images captured at the same focus positions in return paths or images captured at the same focus positions in a forward path and a return path.

In the above-described processing, performing the motion detection by using images at the same focus positions enables the motion detection between in-focus images, making it possible to improve the accuracy of the motion detection between generated focus stacking images.

The above-described method of detecting the subject's motion is also applicable to the second exemplary embodiment.

Although, in the above-described descriptions, the focus bracketing by driving release is performed, the focus bracketing by intermittent drive is also applicable. More specifically, if the subject moves during the focus bracketing by intermittent drive, the system control unit 50 may suspend the focus stacking processing.

According to the present exemplary embodiment, if the subject moves during the focus bracketing by driving release, the above-described processing interrupts the processing for generating a focus stacking image, thus preventing an unnatural focus stacking image from being generated. Then, upon the stop of the subject's motion, the generation of a focus stacking image is restarted, thus preventing the update interval of the live view display of the focus stacking image from being prolonged.

OTHER EXEMPLARY EMBODIMENTS

It should be understood that the above-described exemplary embodiments are mere examples for embodying the disclosure and can be modified in diverse ways.

For example, the embodiment method according to the first exemplary embodiment (hereinafter referred to as a first display mode) and the embodiment method according to the second exemplary embodiment (hereinafter referred to as a second display mode) may be selectively used based on the photographing environment.

In the first display mode, more specifically, in order to photograph a subject in a studio as an example, with an imaging apparatus attached to a tripod, a photographer away from the imaging apparatus adjusts the position of the subject while observing a monitor. In this case, the photographer can quickly check the focus stacking image by using the live view.

In the second display mode, for example, while the photographer is working on a composition in hand-held photograph capturing, the photographer is checking the normal live view image without the focus stacking processing. When the composition is determined, the photographer can check the focus stacking image by using the live view.

For example, before starting photographing, the status detection unit 27 detects the status of the digital camera 100 and acquires a detection result. Detection results to be acquired in this case includes at least one of angular velocity information from the gyro sensor, information about the presence or absence of a tripod through tripod attachment and detachment status detection, and a variation calculated by using motion vectors derived from a plurality of images captured by the imaging unit 22. Alternatively, if the user operates the operation unit 70 to directly set the photographing method, the status detection unit 27 may detect the set photographing method. The system control unit 50 determines the status of the digital camera 100 based on the detection result notified of by the status detection unit 27. With the angular velocity less than a threshold value, a tripod attached to the digital camera 100, or the variation calculated by using the motion vector less than a threshold value, the system control unit 50 sets the first display mode. Otherwise, with the angular velocity equal to or larger than the threshold value, a tripod not attached to it, or the variation calculated by using the motion vector equal to or larger than the threshold value, the system control unit 50 sets the second display mode.

Although the above-described exemplary embodiments are on the premise of a digital camera, the disclosure is not limited to the digital camera. For example, a portable apparatus including an image sensor, and a network camera capable of image photographing are also applicable.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-055972, filed Mar. 26, 2020, which is hereby incorporated by reference herein in its entirety.

The invention claimed is:

1. An apparatus comprising:
   at least one memory configured to store instructions;
   at least one processor in communication with the at least one memory and configured to execute the instructions to:
   receive a photographing instruction; and
   an optical system configured to perform photographing by using a first photographing method before reception of the photographing instruction, and perform photographing by using a second photographing method after reception of the photographing instruction,
   wherein the at least one processor further executes instructions to generate a first combined image by combining a plurality of first images captured at different in-focus positions by using the first photographing method, and to generate a second combined image by combining a plurality of second images captured at different in-focus positions by using the second photographing method,
   wherein the optical system performs readout from a sensor, while keeping drive of a focus lens, to acquire the plurality of first images when using the first photographing method, and stops the focus lens at different positions and performs readout from the sensor a plurality of times to acquire the plurality of second images when using the second photographing method,
   wherein when using the first photographing method, speed of the focus lens is based on read time of the sensor, and
   wherein, upon reception of the photographing instruction while the optical system is performing the first photographing method, the at least one processor further executes instructions to determine a predetermined position to be either a first in-focus position or a second in-focus position based on whether the first in-focus position or the second in-focus position is closer to a current in-focus position; move the focus lens to the predetermined position and then start the second photographing method.

2. The apparatus according to claim 1, wherein the first combined image provides a deeper depth of field than the plurality of first images, and the second combined image provides a deeper depth of field than the plurality of second images.

3. The apparatus according to claim 2, further comprising a monitor configured to display the first combined image.

4. The apparatus according to claim 3,
   wherein the at least one processor further executes instructions to perform first detection for detecting movement of a subject, and
   wherein, upon detection of the movement of the subject in the first detection, the monitor stops displaying the first combined image.

5. The apparatus according to claim 4, wherein, after the monitor stops displaying the first combined image, the monitor displays a live view captured by the optical system.

6. The apparatus according to claim 1, wherein the at least one processor further executes instructions to:
perform first detection for detecting movement of a subject, and
stop process of the combination upon detection of the movement of the subject in the first detection.

7. The apparatus according to claim 4, wherein the at least one processor further executes instructions to, in the first detection, compare images at adjacent focus positions from among the plurality of first images to detect the movement of the subject.

8. The apparatus according to claim 4, wherein the at least one processor further executes instructions to, in the first detection, compare images at the same focus positions from among the plurality of first images to detect the movement of the subject.

9. The apparatus according to claim 3, wherein the at least one processor further executes instructions to, before reception of the photographing instruction, cause the optical system to repetitively perform photographing by using the first photographing method, and combine a plurality of latest images captured by repetitively performing photographing by using the first photographing method to update the first combined image.

10. The apparatus according to claim 3, wherein the monitor displays the second combined image.

11. The apparatus according to claim 1, wherein the optical system performs readout from the sensor by using the second photographing method after the focus lens stops and is at rest.

12. The apparatus according to claim 1, wherein, while reciprocating the focus lens, the optical system captures images for generating one combined image, during one forward path or in one return path.

13. The apparatus according to claim 1, wherein, upon reception of the photographing instruction while the optical system is performing the photographing by using the first photographing method, the at least one processor further executes instructions not to perform photographing by using the first photographing method while the focus lens is being moved to the predetermined position.

14. The apparatus according to claim 1, wherein speed of the focus lens while the focus position is being moved to the predetermined position is faster than the speed of the focus lens while the optical system is performing the first photographing method.

15. The apparatus according to claim 1, wherein, upon reception of the photographing instruction while the optical system is performing the first photographing method, the at least one processor further executes instructions to immediately start the second photographing method.

16. The apparatus according to claim 1, wherein the at least one processor further executes instructions to move the focus position to the predetermined position and then the optical system starts the first photographing method.

17. The apparatus according to claim 16, wherein the predetermined position is a position where the first photographing method is started, or an intermediate position in a forward path and in a return path in the first photographing method, or a position where the forward path ends in the first photographing method, or the focus position of one of the plurality of second images captured by using the second photographing method.

18. The apparatus according to claim 1, wherein the photographing instruction includes an instruction for acquiring a photographing parameter for performing the first or the second photographing method.

19. The apparatus according to claim 1, wherein when using the first photographing method, the speed of the focus lens is based on performance of the focus lens.

20. An apparatus comprising:
at least one memory configured to store instructions;
at least one processor in communication with the at least one memory and configured to execute the instructions to:
receive a photographing instruction;
perform second detection;
an optical system configured to perform a first or a second photographing method based on information detected in the second detection; and
a monitor configured to display a first or a second combined image,
wherein the at least one processor further executes instructions to generate the first combined image based on a plurality of first images captured at different in-focus positions by using the first photographing method, or the second combined image based on a plurality of second images captured at different in-focus positions by using the second photographing method,
wherein the optical system reads a sensor, while keeping drive of a focus lens, to acquire the plurality of first images by using the first photographing method, and stops the focus lens at different positions and reads the sensor a plurality of times to acquire the plurality of second images by using the second photographing method,
wherein when using the first photographing method, speed of the focus lens is based on read time of the sensor, and
wherein, upon reception of the photographing instruction while the optical system is performing the first photographing method, the at least one processor further executes instructions to determine a predetermined position to be either a first in-focus position or a second in-focus position based on whether the first in-focus position or the second in-focus position is closer to a current in-focus position; move the focus position to the predetermined position and then start the second photographing method.

21. The apparatus according to claim 20, wherein the at least one processor further executes instructions to, in the second detection, detect a user operation, or detect an angular velocity, or detect whether a tripod is attached to the apparatus, or detect a motion vector based on images captured by the optical system.

22. A method comprising:
receiving a photographing instruction;
performing, before reception of the photographing instruction, photographing by using a first photographing method, and performing, after reception of the photographing instruction, photographing by using a second photographing method;
generating a first combined image by combining a plurality of first images captured at different in-focus positions by using the first photographing method, and generating a second combined image by combining a plurality of second images captured at different in-focus positions by using the second photographing method, wherein, in the photographing, a sensor is read out, while keeping drive of a focus lens, to acquire the plurality of first images by using the first photographing method, and the focus lens is stopped at different positions and the sensor is read out a plurality of times to acquire the plurality of second images by using the second photographing method, wherein when using the first photographing method, speed of the focus lens is based on read time of the sensor, and wherein, upon reception of the photographing instruction while the optical system is performing the first photographing method, the at least one processor further executes instructions to determine a predetermined position to be either a first in-focus position or a second in-focus position based on whether the first in-focus position or the second in-focus position is closer to a current in-focus position; move the focus lens to the predetermined position and then start the second photographing method.

23. A method comprising:
receiving a photographing instruction;
performing second detection;
performing photographing by using a first or a second photographing method based on information detected in the second detection;
generating a first combined image based on a plurality of first images captured at different in-focus positions by using the first photographing method, or a second combined image based on a plurality of second images captured at different in-focus positions by using the second photographing method; and
displaying the first or the second combined image, wherein, in the photographing, a sensor is read, while drive of a focus lens is being kept, to acquire the plurality of first images by using the first photographing method, and the focus lens is stopped at different positions and the sensor is read a plurality of times to acquire the plurality of second images by using the second photographing method, wherein when using the first photographing method, speed of the focus lens is based on read time of the sensor, and wherein, upon reception of the photographing instruction while the first photographing method is being performed, determining a predetermined position to be either a first in-focus position or a second in-focus position based on whether the first in-focus position or the second in-focus position is closer to a current in-focus position; moving the focus lens to the predetermined position and then starting the second photographing method.

24. A non-transitory computer-readable storage medium which stores a program for causing a computer of an apparatus to execute the method according to claim 22.

25. A non-transitory computer-readable storage medium which stores a program for causing a computer of an apparatus to execute the method according to claim 23.

* * * * *